(12) United States Patent
Kuromizu

(10) Patent No.: US 8,894,237 B2
(45) Date of Patent: Nov. 25, 2014

(54) LIGHTING DEVICE, DISPLAY DEVICE AND TELEVISION RECEIVER

(75) Inventor: Yasumori Kuromizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 394 days.

(21) Appl. No.: 13/380,970

(22) PCT Filed: May 18, 2010

(86) PCT No.: PCT/JP2010/058354
§ 371 (c)(1),
(2), (4) Date: Jan. 13, 2012

(87) PCT Pub. No.: WO2011/001754
PCT Pub. Date: Jan. 6, 2011

(65) Prior Publication Data
US 2012/0327311 A1 Dec. 27, 2012

(30) Foreign Application Priority Data
Jul. 2, 2009 (JP) .................. 2009-158185

(51) Int. Cl.
*F21V 7/00* (2006.01)
*F21S 4/00* (2006.01)
*G02F 1/1335* (2006.01)

(52) U.S. Cl.
CPC .... *G02F 1/133603* (2013.01); *G02F 1/133608* (2013.01); *G02F 1/133605* (2013.01)
USPC .................. 362/247; 362/296.01; 362/249.01

(58) Field of Classification Search
CPC ...................................... F21V 17/06
USPC ..................................... 362/97.2, 296.01, 247
See application file for complete search history.

(56) References Cited

U.S. PATENT DOCUMENTS

| 7,324,174 B2 * | 1/2008 | Hafuka et al. ............... 349/61 |
| 2005/0281050 A1 | 12/2005 | Chou |
| 2007/0019419 A1 | 1/2007 | Hafuka et al. |

(Continued)

FOREIGN PATENT DOCUMENTS

| CN | 101473170 A | 7/2009 |
| JP | 2007-317423 A | 12/2007 |

(Continued)

OTHER PUBLICATIONS

Official Communication issued in International Patent Application No. PCT/JP2010/058354, mailed on Aug. 17, 2010.

*Primary Examiner* — Anh Mai
*Assistant Examiner* — Zachary J Snyder
(74) *Attorney, Agent, or Firm* — Keating & Bennett, LLP

(57) ABSTRACT

A backlight unit 12 according to the present invention includes an LED 17, an LED board 18, a connector 25, a chassis-side reflection sheet 22, and a support 26. The LED 17 is a light source. The LED 17 is mounted on the LED board 18. The connector 25 is a mounted component mounted on a mounting surface 18a of the LED board 18 on which the LED 17 is mounted. The chassis-side reflection sheet 22 is a reflection sheet 21 configured to reflect light and arranged on a side on which the mounting surface 18a is arranged. The mounting surface 18a is the surface on which the LED 17 and the connector 25 are mounted. The support 26 holds the chassis-side reflection sheet 22 away from the mounting surface 18a of the LED board 18.

22 Claims, 27 Drawing Sheets

(56) References Cited

U.S. PATENT DOCUMENTS

| | | | |
|---|---|---|---|
| 2007/0103908 A1* | 5/2007 | Tabito et al. | 362/294 |
| 2008/0094830 A1 | 4/2008 | Chang | |
| 2008/0111949 A1* | 5/2008 | Shibata et al. | 349/64 |
| 2008/0117356 A1* | 5/2008 | Oku et al. | 349/62 |
| 2008/0259240 A1 | 10/2008 | Song et al. | |
| 2008/0266876 A1* | 10/2008 | Chang | 362/309 |
| 2008/0284942 A1* | 11/2008 | Mahama et al. | 349/64 |
| 2009/0135331 A1* | 5/2009 | Kawase | 349/58 |
| 2010/0039572 A1 | 2/2010 | Takata et al. | |

FOREIGN PATENT DOCUMENTS

| | | |
|---|---|---|
| JP | 2008-198398 A | 8/2008 |
| JP | 2008-300277 A | 12/2008 |
| JP | 2009-076456 A | 4/2009 |
| JP | 2009-129706 A | 6/2009 |
| WO | 2006/018996 A1 | 2/2006 |

* cited by examiner

FIG.1
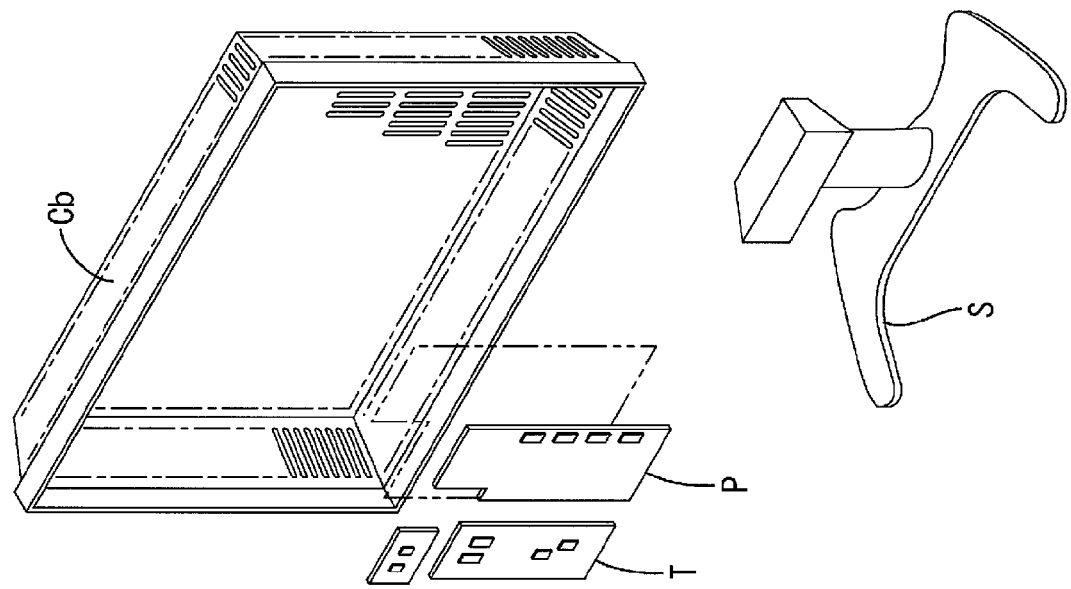
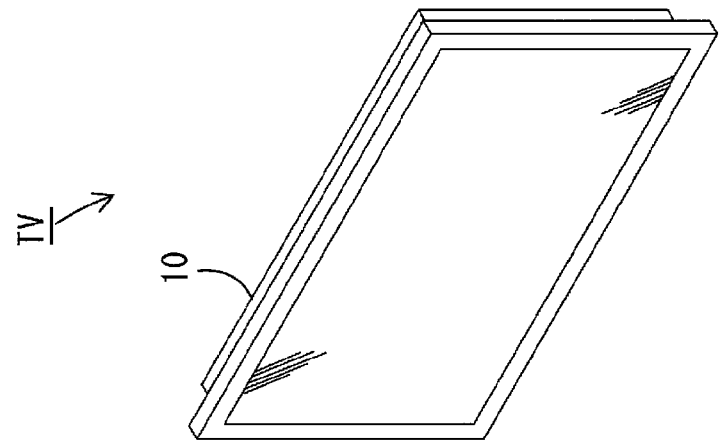
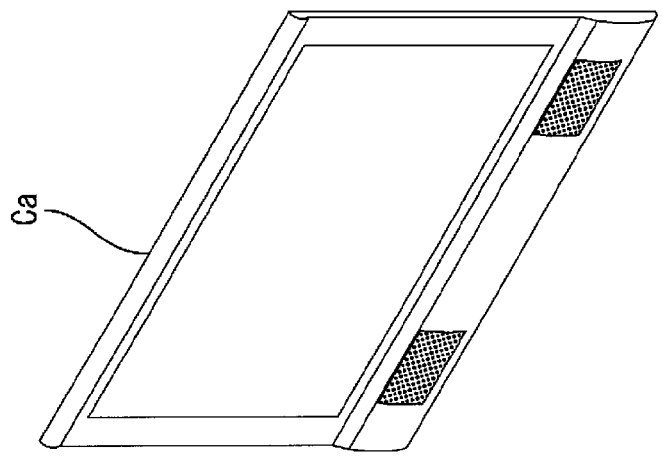

LIGHTING DEVICE, DISPLAY DEVICE AND TELEVISION RECEIVER

TECHNICAL FIELD

The present invention relates to a lighting device, a display device and a television receiver.

BACKGROUND ART

A liquid crystal panel included in a liquid crystal display device such as a liquid crystal television does not emit light, and thus a backlight device is required as a separate lighting device. A backlight device is generally arranged behind the liquid crystal panel (i.e., on a side opposite from a display surface side). It includes a chassis, alight source, a reflection sheet, and an optical member (a diffuser). The chassis has an opening on the liquid crystal panel side. The light source is housed in the chassis. The reflection sheet is arranged along the inner surface of the chassis and configured to reflect light toward the opening of the chassis. The optical member is arranged over the opening of the chassis and configured to efficiently release light emitted by the light source to the liquid crystal panel side. The light source, which is one of the components of the above backlight device, may be LEDs. When the LEDs are used, an LED board on which the LEDs are mounted may be housed in the chassis.

A backlight device using LEDs as a light source is disclosed in Patent Document 1.

RELATED ART DOCUMENT

Patent Document

Patent Document 1: Japanese Unexamined Patent Application Publication No. 2007-317423

Problem to be Solved by the Invention

When a size of a liquid crystal display device including LED boards is increased, a technique to use a plurality of the LED boards connected in series may be applied. In such a case, connectors are mounted on the respective LED boards and the connectors of the adjacent LED boards are connected. When the connectors are mounted on the mounting surface on which the LEDs are mounted, the following problem may occur. When the reflection sheet configured to reflect light within the chassis is arranged along the mounting surface, the reflection sheet may be lifted by the connectors and deformed. This is because levels of the connectors and the mounting surface of the LED board are different. When the reflection sheet is deformed, ununiformity in rays of reflected light may occur. As a result, uneven brightness may occur in light emitted from the backlight device.

Disclosure of the Present Invention

The present invention was made in view of the foregoing circumstances. An object of the present invention is to reduce uneven brightness in emitted light.

Means for Solving the Problem

To solve the above problem, a lighting device of the present invention includes a light source, a light source board on which the light source is mounted, a mounted component, a reflection member, and a support. The mounted component is mounted on a mounting surface of the light source board on which the light source is mounted. The reflection member is configured to reflect light and arranged on a side on which the mounting surface of the light source board is located. The light source and the mounted component area mounted on the mounting surface. The support holds the reflection member away from the mounting surface of the light source board.

The reflection member is arranged on the side on which the mounting surface of the light source board is located. The light source and the mounted component are mounted on the mounting surface. Furthermore, the reflection member is held away from the mounting surface by the support. Because the mounted component is mounted on the mounting surface of the light source board, a difference in levels between the mounting surface and the mounted component. However, the reflection member arranged on the side on which the mounting surface is arranged is held away from the mounting surface by the support. Therefore, the reflection member is less likely to deform and thus ununiformity in rays of light reflected by the reflection member is less likely to occur. The light source board is a single-sided mounting board. The light source and the mounted component are mounted on the same surface. Therefore, the manufacturing cost can be reduced.

To reduce the deformation of the reflection member, a hole through which the mounted component is passed may be formed in the reflection member. If such a technique is used, the mounted component is exposed through the holes. As a result, uniform light reflectivity cannot be achieved. According to the present invention, the deformation of the reflection member is reduced without such a hole in the reflection member. Therefore, the light reflectivity remains uniform.

BRIEF DESCRIPTION OF THE DRAWINGS

FIG. 1 is an exploded perspective view illustrating a general construction of a television receiver according to a first embodiment of the present invention;

MODE FOR CARRYING OUT THE INVENTION

<First Embodiment>

A first embodiment of the present invention will be explained with reference to FIGS. 1 to 20. In this description, a liquid crystal display device 10 will be illustrated. X-axis, Y-axis and Z-axis are indicated in some drawings. The axes in each drawing correspond to the respective axes in other drawings. The upper side and the lower side in FIGS. 4 and 5 correspond to the front side and the rear side, respectively.

Figure 2:
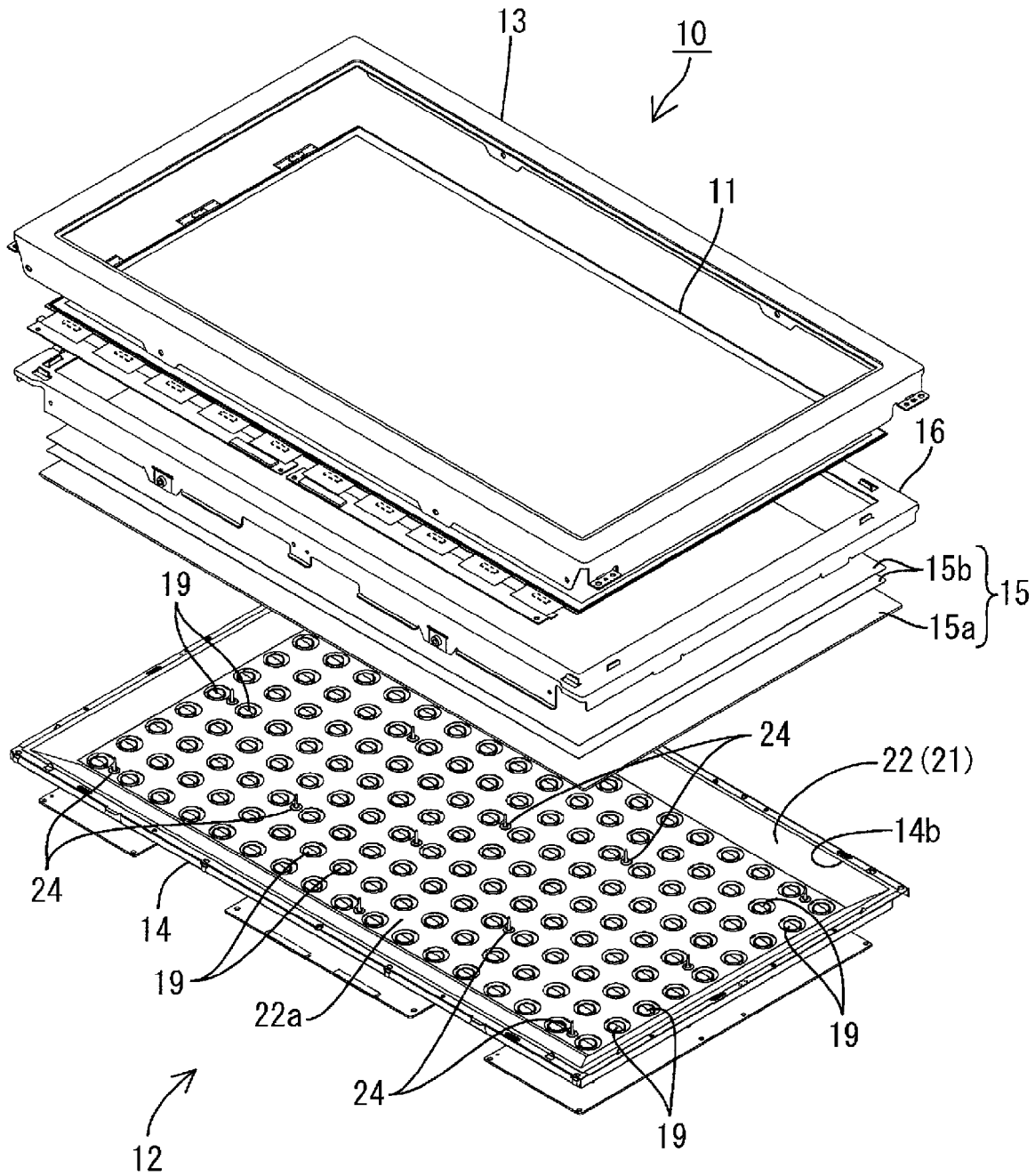
FIG. 2 is an exploded perspective view illustrating a general construction of a liquid crystal display device included in the television receiver.

As illustrated in FIG. 1, the television receiver TV of this embodiment includes the liquid crystal display device 10, front and rear cabinets Ca, Cb that house the liquid crystal display device 10 therebetween, a power source P, a tuner T, and a stand S. An overall shape of the liquid crystal display device (a display device) 10 is a landscape rectangular. The liquid crystal display device 10 is held in a vertical position. As illustrated in FIG. 2, it includes a liquid crystal panel 11 as a display panel, and a backlight unit (a lighting device) 12, which is an external light source. They are integrally held by a bezel 13 having a frame-like shape. A screen size is 42 inches and an aspect ratio is 16:9.

Next, the liquid crystal panel 11 and the backlight unit 12 included in the liquid crystal display device 10 will be explained. The liquid crystal panel (display panel) 11 has a rectangular plan-view shape. It is constructed such that a pair of glass substrates is bonded together with a predetermined gap therebetween and liquid crystals are sealed between the glass substrates. On one of the glass substrates, switching components (e.g., TFTs) connected to source lines and gate lines that are perpendicular to each other, pixel electrodes connected to the switching components, and an alignment film are provided. On the other substrate, a color filter having color sections such as R (red), G (green) and B (blue) color sections arranged in a predetermined pattern, counter electrodes, and an alignment film are provided. Polarizing plates are attached to outer surfaces of the substrates.

Figure 3:
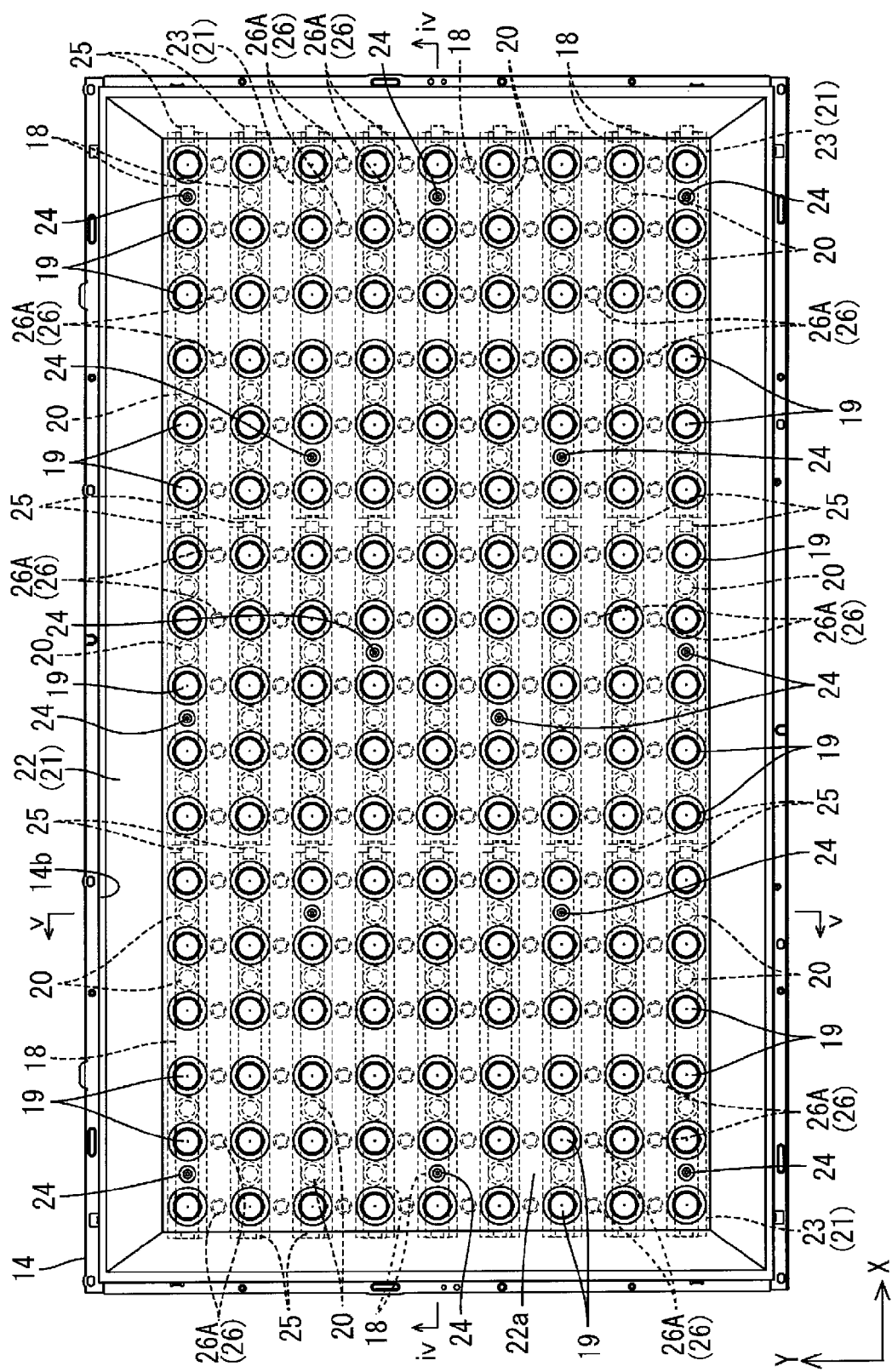
FIG. 3 is a plan view illustrating an arrangement of LED boards and holding members in a chassis of the liquid crystal display device.
Figure 4:
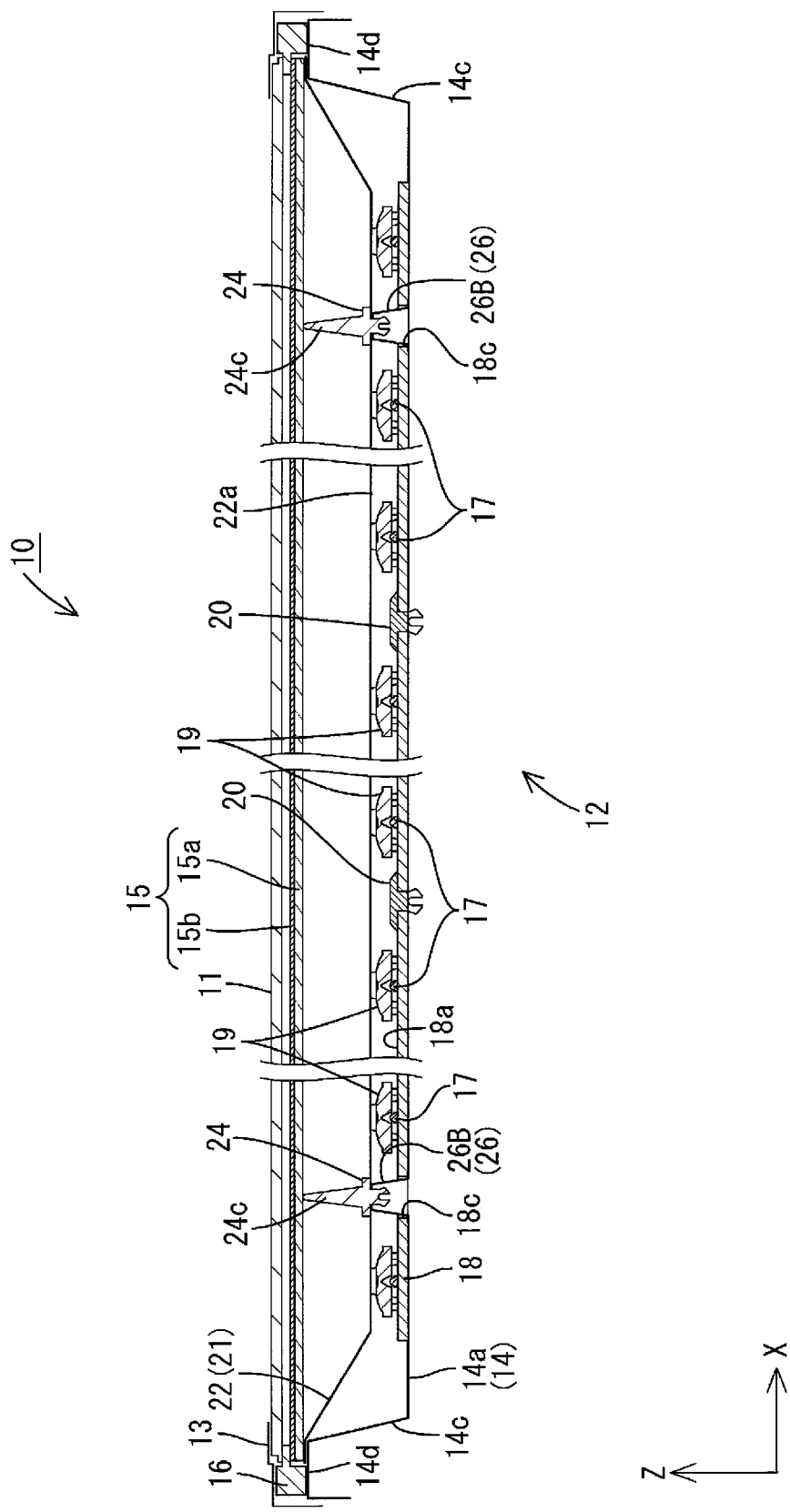
FIG. 4 is a cross-sectional view of the liquid crystal display device along line iv-iv in FIG. 3.
Figure 5:
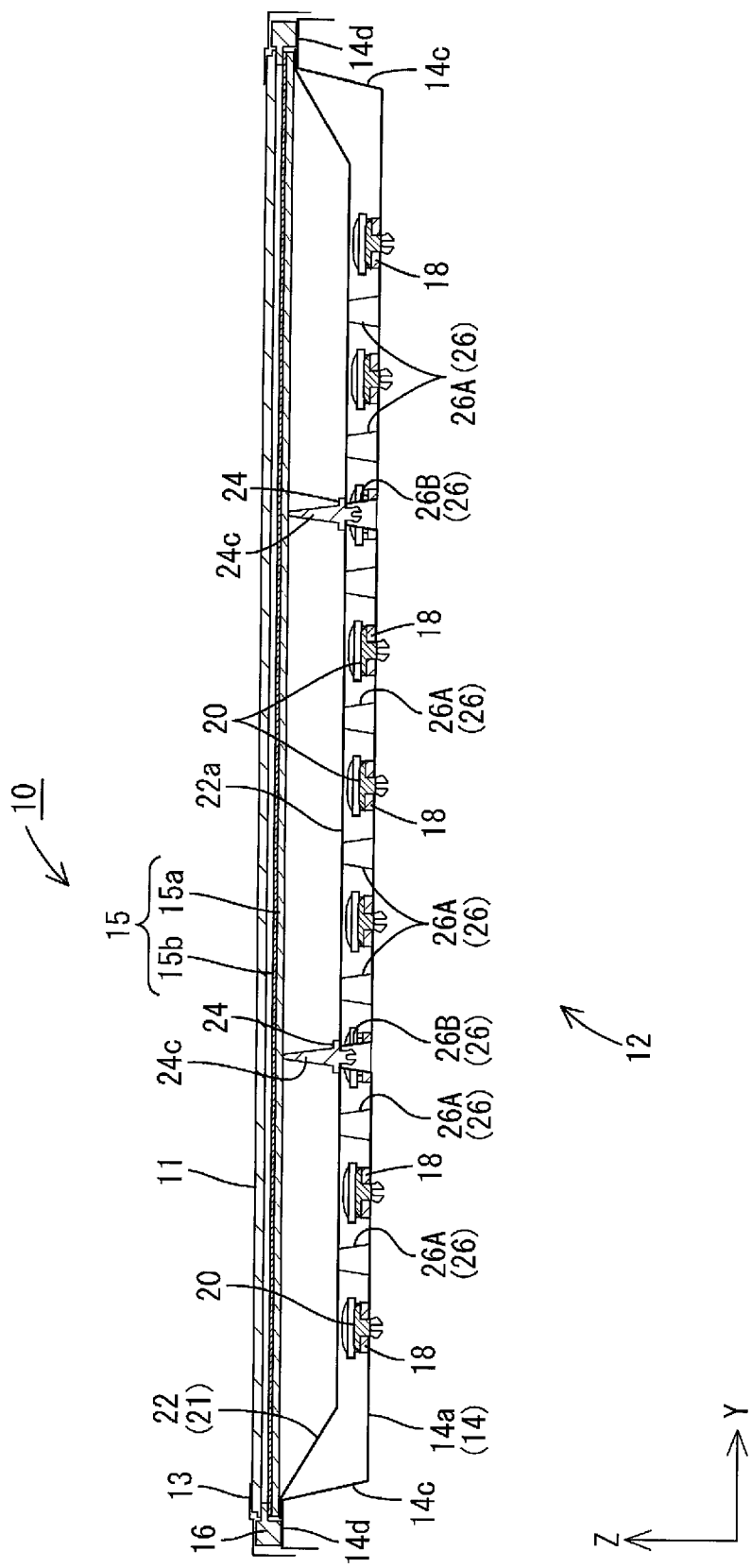
FIG. 5 is a cross-sectional view of the liquid crystal display device along line v-v in FIG. 3.

Next, the backlight unit 12 will be explained in detail. As illustrated in FIG. 2, the backlight unit 12 includes a chassis 14, an optical member 15 (a diffuser plate (an optical diffusing member) 15a and a plurality of optical sheets 15b arranged between the diffuser plate 15a and the liquid crystal panel 11), and frames 16. The chassis 14 has a box-like shape and an opening on the light emitting side (on the liquid crystal panel 11 side). The optical member 15 is arranged so as to cover the opening of the chassis 14. The frames 16 are arranged along the outer edges of the chassis 14. The outer edges of the optical member 15 are sandwiched between the chassis 14 and the frames 16. As illustrated in FIGS. 3 to 5, LEDs 17 (light emitting diodes), LED boards 18 on which the LEDs 17 are mounted, and diffuser lenses 19 are arranged inside the chassis 14. The LEDs are a light source. The diffuser lenses 19 are mounted on the respective LED boards 18 at locations corresponding to the LEDs 17. Furthermore, board holding members 20, a reflection sheet 21, and sheet holding members 24 are arranged inside the chassis 14. The LED boards 18 are held between the chassis 14 and the board holding members 20. The reflection sheet 21 reflects light inside the chassis 14 toward the optical member 15. The sheet holding members 24 hold a chassis-side reflection sheet 22, which will be explained later. In the backlight unit 12, a side closer to the optical member 15 than the LEDs 17 is a light output side. Components of the backlight unit 12 will be explained detail below.

The chassis 14 is made of metal. As illustrated in FIGS. 3 to 5, the chassis 14 includes a bottom plate 14a, side plates 14c, and receiving plates 14d. The bottom plate 14a has a rectangular shape similar to the liquid crystal panel 11. Each side plate 14c rises from an outer edge of the corresponding side of the bottom plate 14a. Each receiving plate 14d projects from the top edge of the corresponding side plate 14c. The chassis 14 has a shallow-box-like (or a shallow-tray-like) overall shape with an opening on the front side. The chassis 14 is orientated with the long-side direction thereof aligned with the X-axis direction (the horizontal direction) and the short-side direction thereof aligned with the Y-axis direction (the vertical direction). The optical member 15, which will be explained next, is placed on the receiving plates 14d of the chassis 14 on the front side. The frames 16 are screwed to the receiving plate 14d. The bottom plate 14a of the chassis 14 has mounting holes 14 for mounting the board holding members 20. A plurality of the mounting holes 14e are arranged disperse locations in the bottom plate 14a corresponding to the locations of the board holding members 20.

As illustrated in FIG. 2, the optical member 15 has a landscape rectangular plan-view shape similar to the liquid crystal panel 11 and the chassis 14. As illustrated in FIGS. 4 and 5, the optical member 15 is arranged between the liquid crystal panel 11 and the LEDs 17 so as to cover the opening 14b of the chassis 14 with the outer edges thereof placed on the receiving plates 14. The optical member 15 includes the diffuser plate 15a and the optical sheets 15b. The diffuser plate 15a is arranged on the rear side (the LED 17 side, an opposite side from the light output side). The optical sheets 15b are arranged on the front side (the liquid crystal panel 11 side, the light output side). The diffuser plate 15a includes a nearly transparent resin substrate in a specified thickness and with a large number of diffusing particles scattered therein. The diffuser plate 15a has a function for diffusing light that transmits therethrough. The optical sheets 15b has two layers of sheets in thickness smaller than the thickness of the diffuser plate 15a (see FIGS. 7 to 9). Specific examples of the optical sheets 15b may be a diffuser sheet, a lens sheet, and a reflection-type polarizing sheet. Appropriate types of sheets may be selected from the above type of sheets and used.

As illustrated in FIG. 2, the frame 16 has a frame-like shape along the outer edges of the liquid crystal panel 11 and the optical member 15. The outer edges of the optical member 15 are sandwiched between the frames 16 and the respective receiving plates 14d (see FIGS. 4 and 5). The frames 16 receive the outer edges of the liquid crystal panel 11 from the rear side. The outer edges of the liquid crystal panel 11 are sandwiched between the frames 16 and the bezel 13 that is arranged on the front side (see FIGS. 4 and 5).

Figure 7:
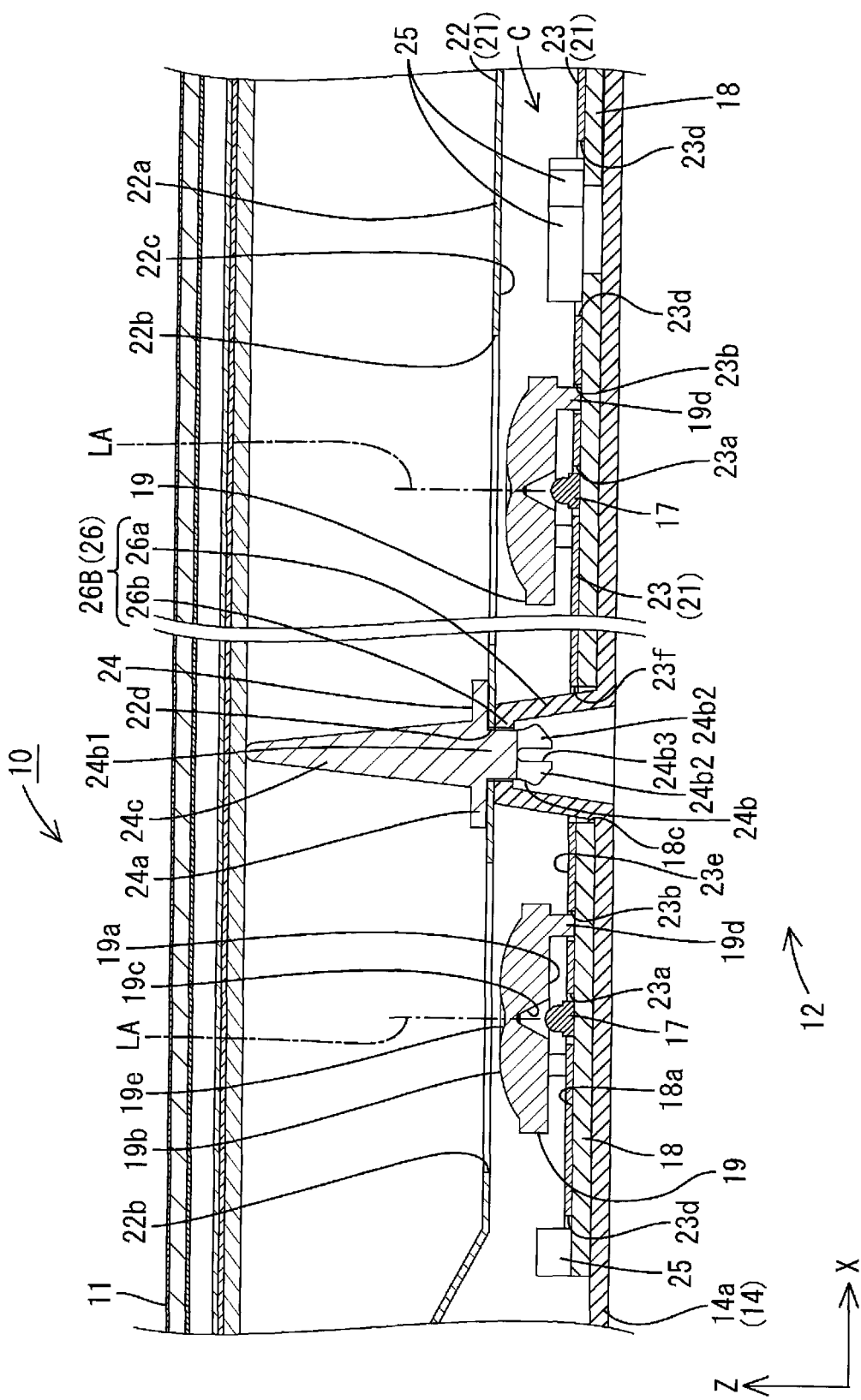
FIG. 7 is a cross-sectional view along line vii-vii in FIG. 6.
Figure 8:
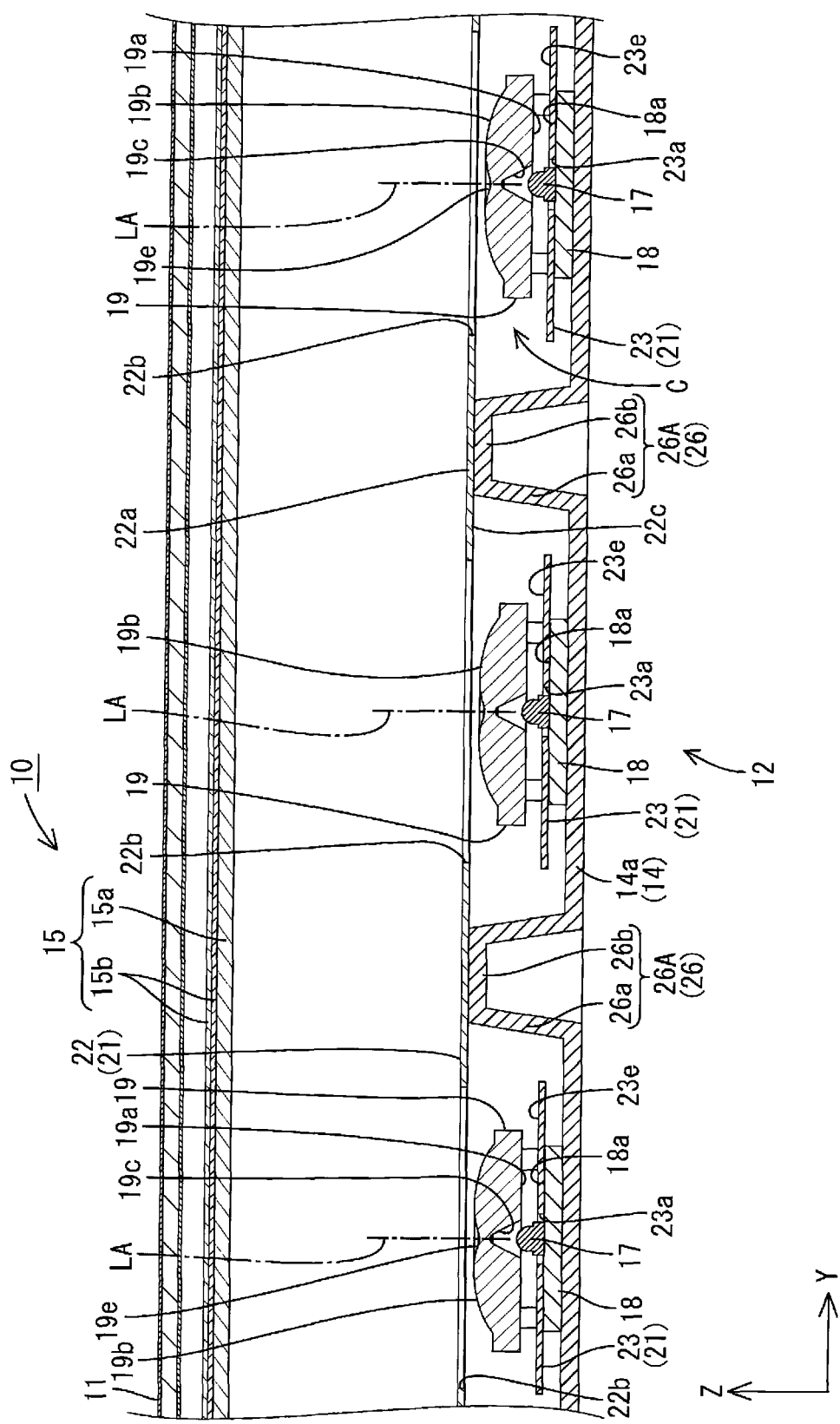
FIG. 8 is a cross-sectional view along line viii-viii in FIG. 6.
Figure 10:
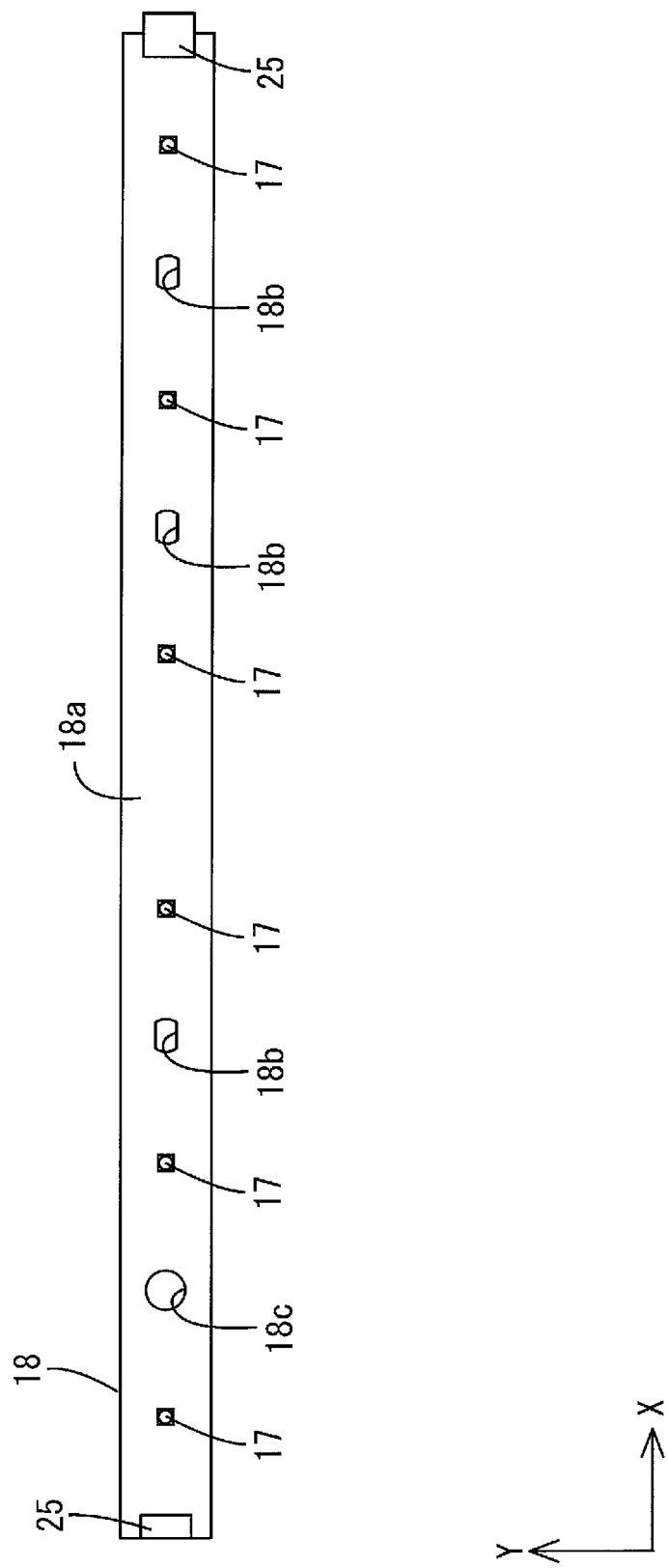
FIG. 10 is a plan view of the LED board.

Next, the LEDs 17 and the LED boards 18 on which the LEDs 17 are mounted will be explained in detail. As illustrated in FIGS. 7, 8 and 10, each LED 17 is prepared by sealing an LED chip on a board fixed to the LED board 18 with a resin material. The LED chip mounted on the board has one kind of main emission wavelength. Specifically, the LED chip is a single light emitting chip configured to emit blue light. The resin material that seals the LED chip includes fluorescent substances that coverts the blue light emitted by the LED chip to white light. The fluorescent substances are scattered in the resin material. With this configuration, the LEDs 17 emit white light. A surface of each LED 17 on a side away from the mounting surface of the LED board 18 is a light emitting surface 17a. Namely, the LED 17 is a top light-emitting-type LED. A light axis LA of the LED 17 is substantially aligned with the Z-axis direction (a direction perpendicular to the main plate surface of the liquid crystal panel 11 or the optical member 15). Light emitted by the LED 17 three-dimensionally and radially spreads to some extent within a specified angle range around the light axis LA. The directivity is higher than that of cold cathode tubes. Namely, the intensity of light emitted by the LED 17 shows an angle distribution that it tends to be significantly higher in the direction along the light axis LA and sharply decrease as an angle to the light axis LA increases.

As illustrated in FIG. 10, each LED board 18 includes a substrate having a rectangular plan-view shape. The LED boards 18 are arranged along the bottom plate 14a with the long-side direction thereof aligned with the X-axis direction and the short-side direction thereof aligned with the Y-axis direction, and housed in the chassis 14 (see FIG. 3). The substrate of each LED board 18 is made of metal, for instance, aluminum-contained material similar to the chassis 14. On the surface of the substrate, metal-film wiring patterns including copper foil wiring patterns are formed via an insulating film. An insulating material such as ceramic may be used for the substrate of the LED board 18. As illustrated in FIGS. 7, 8 and 10, the LEDs 17 having the configuration described earlier are surface mounted on the front surface (the surface on the opening 14b side, or the surface away from the bottom plate 14a of the chassis 14). The front surface is one of plate surfaces of the substrate of the LED board 18 and a mounting surface 18a. The LEDs 17 are arranged parallel to each other in line along the long-side direction of the LED board 18 (or the X-axis direction), and connected in series via the wiring patterns formed on the LED board 18. Intervals between the LEDs 17 are substantially equal. Namely, the LEDs 17 are arranged at equal intervals.

Connectors (mounting parts) 25 are attached to each LED board at ends with respect to the long-side direction thereof. The connectors 25 are connected to the wiring patterns. The connectors 25 are mounting parts having functions for connecting the LED boards 18 to an external control circuit and connecting the adjacent LED boards 18. The connectors 25 are not optical parts having optical functions (light emitting functions, light diffusing functions, or light guiding functions) such as the LEDs 17 and the diffuser lenses 19. Namely, the connectors 25 are parts for making electrical connections and non-optical parts. The connectors 25 are mounted on the mounting surface 18a of each LED board 18 on which the LEDs 17 are mounted. Namely, each LED board 18 is a single-side mounting board having the mounting surfaces 18a, on one of which the LEDs 17 and the connectors 25 are mounted. Such a single-side mounting board has an advantage in manufacturing cost over a double-side mounting board. Each connector 25 has a height so as to project more to the front than the LEDs 17.

As illustrated in FIG. 3, a plurality of the LED boards 18 having the above configurations are arranged along the X-axis direction and the Y-axis direction, respectively, inside the chassis 14. The LED boards 18 are arranged parallel to one another with the long sides and the short sides aligned, respectively. Namely, inside the chassis 14, the LED boards 18 and the LEDs 17 mounted on the LED boards 18 are arranged in a matrix. The row direction and the column direction correspond to the X-axis direction (the long-side directions of the chassis 14 and the LED boards 18) and the Y-axis direction (the short-side directions of the chassis 14 and the LED boards 18), respectively. Specifically, three LED boards 18 along the X-axis direction by nine LED boards 18 along the Y-axis direction and a total of twenty-seven LED boards are arranged parallel to one another inside the chassis 14. In this embodiment, two kinds of the LED boards 18, having different long-side lengths and including the different numbers of the LEDs 17 mounted thereon, are used. One of the kinds is a six-LED-type LED board 18 on which six LEDs 17 are mounted and having a relatively larger long-side dimension. The other kind is a five-LED-type LED board 18 on which five LEDs 17 are mounted and having a relatively smaller long-side dimension. The six-LED-type LED boards 18 are arranged at the respective ends of the chassis 14 with respect to the X-axis direction. The five-LED-type LED board 18 is arranged in the middle with respect to the X-axis direction. As described above, the LED boards 18 arranged in line along the X-axis direction forming one row are electrically connected to one another when the adjacent connectors 25 are engaged with each other. Furthermore, the connectors 25 at the ends of the chassis 14 with respect to the X-axis direction are electrically connected to the external control circuit that is not shown in the figures. With this configuration, the LEDs 17 on the LED boards 18 in one row are connected in series. Furthermore, and turn-on and turn-off of a number of the LEDs 17 in the row can be controlled by a single control circuit. This contributes to a cost reduction. Although the different kinds of the LED boards 18 have different long-side dimensions and include different numbers of the LEDs 17, the short-side dimensions and intervals between the LEDs 17 are substantially the same.

As described above, multiple kinds of the LED boards having the different long-side sizes and including the different numbers of the LEDs 17 mounted thereon are prepared. By using the different kinds of the LED boards 18 in appropriate combinations, the following effects can be achieved. In manufacturing of multiple kinds of the liquid crystal displays 10 in different screen sizes, the size can be easily altered by changing the kinds of the LED boards 18 to be used and the numbers of the respective kinds of the LED boards 18. In comparison to a configuration in which LED boards are exclusively designed for each screen size such that the long-side dimension thereof corresponds to the long-side dimension of the chassis 14, the kinds of the required LED boards 18 can be significantly reduced. This contributes to a manufacturing cost reduction. Specifically, an eight-LED-type LED board 18 on which eight LEDs 17 are mounted may be used in addition to two kinds of the LED boards 18 (the five-LED-type and the six-LED-type). When these three kinds of the LED boards 18 may be used in appropriate combination for the liquid crystal display devices 10 in different screen sizes, for instance, 26-inch, 32-inch, 37-inch, 40-inch, 42-inch, 46-inch, 52-inch, and 65-inch screen sizes, the liquid crystal display devices 10 can be easily manufactured at low cost.

Figure 11:
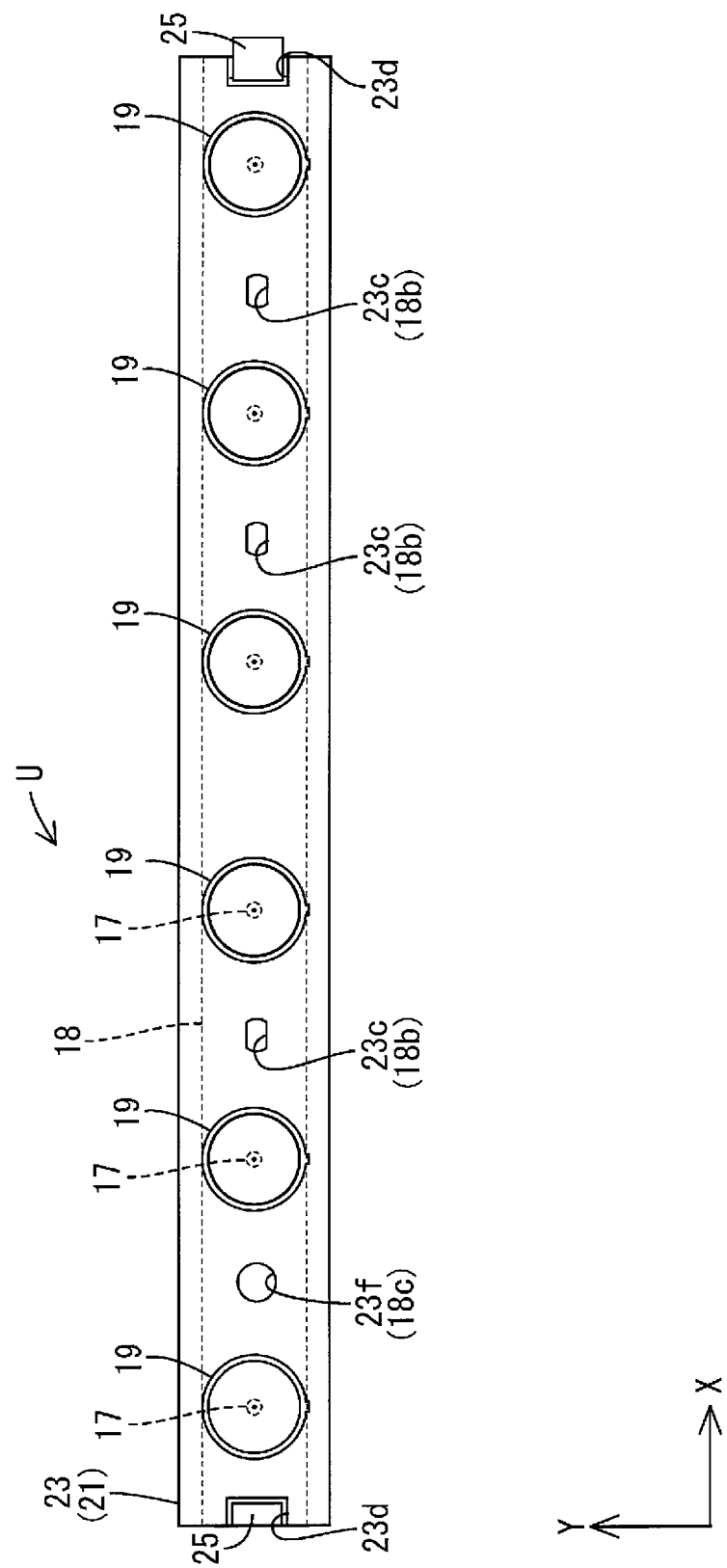
FIG. 11 is a plan view of the LED board with a board-side reflection sheet and a diffuser lens is attached (a light source unit)

Each diffuser lens 19 is made of synthetic resin that is nearly transparent (i.e., capable of light transmission at high level) and has a refraction index higher than that of the air (e.g., polycarbonate or acrylic). As illustrated in FIGS. 7, 8, and 11, the diffuser lens 19 has a specified thickness and a circular plan view shape. The diffuser lenses 19 are mounted to the respective LED boards 18 so as to cover the respective LEDs 17 from the front side, that is, so as to overlap the respective LEDs in plan view. The diffuser lenses 19 are configured to diffuse highly directional light and output the diffused light. Namely, the directivity of the light emitted by each LED 17 can be lowered by the diffuser lens 19 and thus an area between the adjacent LEDs 17 is less likely to be recognized as a dark area even when a distance between the adjacent LEDs 17 is large. Therefore, the number of the LEDs 17 can be reduced. Each diffuser lens 19 has the height so as to project more to the front than the connectors 25 when mounted on the LED board 18. The diffuser lens 19 is arranged substantially concentrically with the LED 17 in plan view. The X-dimension and the Y-dimension of each diffuser lens 19 are significantly larger than those of the LED 17, respectively. The X-dimension of the diffuser lens 19 is smaller than that of the LED board 18. The Y-dimension of the diffuser lens 19 is larger than that of the LED board 18. The ends of the Y-dimension of the diffuser lens 19 project outward from the LED board 18 with respect to the Y-axis direction by a specified length.

A surface of each diffuser lens 19 facing the rear and the LED board 18 is a light entrance surface 19a through which the light from the LED 17 enters. A surface of the diffuser lens 19 facing the front and the optical member 15 is a light exit surface through which the light exits. As illustrated in FIGS. 7 and 8, the light entrance surface 19a is generally parallel to the board surface of the LED board 18 (along the X-axis direction and the Y-axis direction). The light entrance surface 19a also includes a sloped surface. A light-entrance-side recess 19c is formed in an area overlapping the LED 17 in plan view. As a result, the sloped surface is formed. The light-entrance-side recess 19c is a funnel-like recess formed substantially concentrically with the diffuser lens 19. The light-entrance-side recess 19c opens toward the rear, that is, toward the LED 17. The diameter of the light-entrance-side recess 19c is the largest at the opening end and larger than the diameter of the LED 17. The diameter gradually decreases toward the front. The diameter is the smallest at the front end. The cross section of the light-entrance-side recess 19c is an inverted V shape. The wall of the light-entrance-side recess 19c is the sloped surface that is angled with respect to the Z-axis direction. The sloped surface is angled such that the front end thereof crosses the light axis LA of the LED 17. The light emitted from the LED 17 and entering the light-entrance-side recess 19c enters the diffuser lens 19 through the sloped surface. At that time, the light bends away from the center by an angle of the sloped surface with respect to the light axis LA, that is, the light is refracted at a wide angle after it enters the diffuser lens 19.

Mounting legs 19d project from areas of the light entrance surface 19a of the diffuser lens 19 more to the outside in the radial direction than the light-entrance-side recess 19c toward the LED board 18. The mounting leg 19d are mounting structures for mounting the diffuser lens 19 to the LED board 18. Three mounting legs 19d are arranged close to the outside than the light-entrance-side recess 19c of the diffuser lens 19. The mounting legs 19d are arranged such that lines connecting the mounting legs 19d substantially form an equilateral triangle. The tips of the mounting legs 19d are fixed to the LED board 18 with adhesives. As a result, the diffuser lens 19 is fixed to the LED board 18 in the mounting position. Because the diffuser lens 19 is fixed to the LED board 18 via the mounting legs 19d, a specified gap is created between the light entrance surface 19a and the LED board 18. Light in a space outside the diffuser lens 19 when viewed in plan may enter into the gap. When the diffuser lens 19 is in the mounting position, a part of the LED 17 projecting from the LED board 18 is inserted in the light-entrance-side recess 19c.

The light-exit-side surface 19b of the diffuser lens 19 is a gently curved nearly spherical surface. Light exiting the diffuser lens 19 can be refracted at an interface with an outer air layer such that the light travels away from the center, that is, refracted at a wide angle. In the area of the light exit surface 19b overlapping the LED 17 in plan view, the light-exit-side recess 19e is formed. The light-exit-side recess 19e is formed in a mortar-like shape. A peripheral surface around the light-exit-side recess 19e is a gently curved nearly spherical surface down-sloped toward the center. An angle between a tangent line to the peripheral surface around the light-exit-side recess 19e and the light axis LA of the LED 17 is relatively larger than an angle between the sloped surface in the light-entrance-side recess 19c and the light axis LA. In the area of the light exit surface 19b overlapping the LED 17 in plan view, the amount of light from the LED 17 is significantly larger than those in other areas. Namely, the brightness in that area tends to be locally high. With the light-exit-side recess 19e formed in that area, most of light from the LED 17 is refracted at the wide angle and exits, or a part of the light from the LED 17 is reflected toward the LED board 18. With this configuration, the brightness in the area of the light exit surface 19b overlapping the LED 17 is less likely to be locally high and thus uneven brightness is preferably reduced.

Next, the reflection sheet 21 will be explained. The reflection sheet 21 includes the chassis-side reflection sheet and board-side reflection sheets 23. The chassis-side reflection sheet 22 is in a size such that it can cover about an entire inner surface of the chassis 14. Each board-side reflection sheet 23 is in a size such that it can cover the corresponding LED board 18. The reflection sheets 22 and 23 are made of synthetic resin with white surfaces having high light reflectivity. The chassis-side reflection sheet 22 is arranged more to the front (on the opening 14b side, on a side away from the LED board 18) than the board-side reflection sheets 23.

Figure 6:
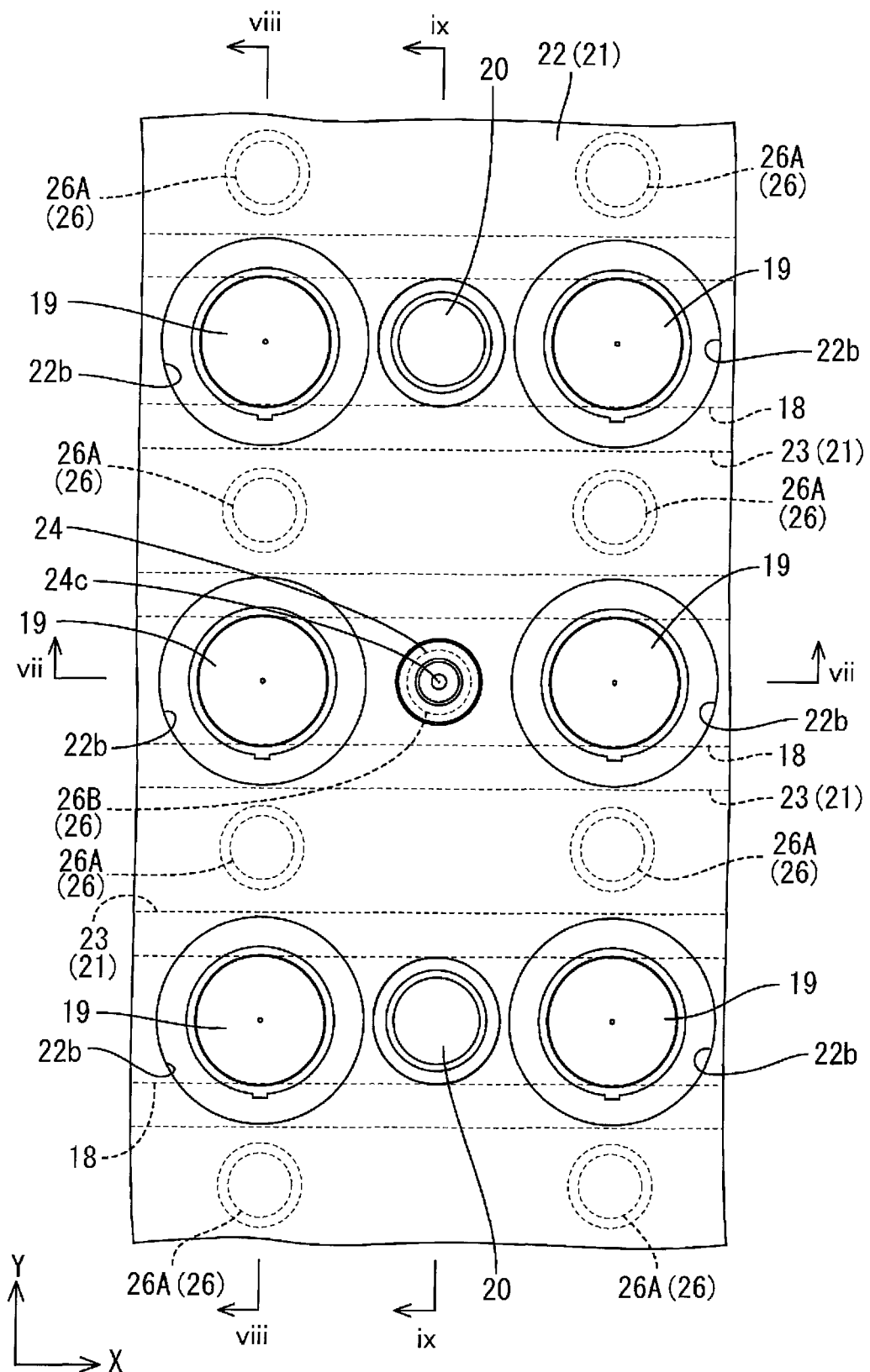
FIG. 6 is a plan view illustrating the arrangement of the LED boards and the holding members in detail.

First, the chassis-side reflection sheet 22 will be explained. As illustrated in FIG. 3, the chassis-side reflection sheet 22 extends along the inner surface of the chassis 14. A central area of the chassis-side reflection sheet 22 extending along the bottom plate 14a of the chassis 14 is a body portion 22a. The body portion 22a has through holes 22b through which light exiting the diffuser lenses 19 arranged inside the chassis 14 passes. The holes 22b are arranged parallel to one another at locations in the body portion 22a overlapping the respective diffuser lenses 19 in plan view, that is, arranged in a matrix. As illustrated in FIG. 6, each hole 22b has a round plan-view shape and a diameter larger than that of the diffuser lens 19. As illustrated in FIG. 3, the chassis-side reflection sheet 22 covers areas between the adjacent diffuser lenses 19 and outer peripheral areas inside the chassis 14. Therefore, rays of light traveling to those areas are reflected toward the optical member 15 (toward the opening 14b). As illustrated in FIG. 7, the chassis-side reflection sheet 22 also covers areas of the LED boards 18 overlapping the connectors 25, which are non-optical parts, in plan view. Furthermore, the chassis-side reflection sheet 22 covers entire areas of the connectors 25 from the front. Therefore, the connectors 25 are not exposed on the front side (the opening 14b side). When the light reflectivity at the surfaces of the connectors 25 is different from the light reflectivity at the chassis-side reflection sheet 22, a variation in overall light reflectivity inside the chassis 14 is less likely to be produced. Therefore, the uniformity can be maintained. Furthermore, as illustrated in FIGS. 4 and 5, the outer peripheral areas of the chassis-side reflection sheet 22 are lifted so as to cover the side plates 14c and the receiving plates 14d of the chassis 14. The areas of the chassis-side reflection sheet 22 placed on the receiving plates 14d are sandwiched between the chassis 14 and the optical member 15. Areas of the chassis-side reflection sheet 22 connecting the body portion 22a and the areas placed on the receiving plates 14d are sloped.

As illustrated in FIG. 11, each board-side reflection sheet 23 extends along the corresponding LED board 18 and has a substantially the same outline as the LED board 18, that is, a rectangular plan-view shape. As illustrated in FIGS. 7 and 8, the board-side reflection sheet 23 is arranged between the diffuser lenses 19 and the LED board 18 so as to face the light entrance surfaces 19b of the diffuser lenses 19 (the surfaces on the LED 17 side). Therefore, the board-side reflection sheet 23 is located inside the hole 22b of the chassis-side reflection sheet 22 in plan view. The chassis-side reflection sheet 22 is arranged on the front side. The board-side reflection sheet 23 reflects light traveling in the hole 22b toward the diffuser lens 19.

As illustrated in FIG. 11, each board-side reflection sheet 23 has a long-side dimension substantially the same as the LED board 18 and a short-side dimension larger than the LED board 18. As illustrated in FIGS. 6 and 8, the short-side dimension of the board-side reflection sheet 23 is larger than the diameters of the diffuser lens 19 and the hole 22b of the chassis-side reflection sheet 22. Namely, the board-side reflection sheet 23 is arranged in about an entire area inside each hole 22b in plan view (including area between the diffuser lens 19 and the edge of the hole 22b in plan view). Furthermore, the board-side reflection sheet 23 overlaps the edges of the holes 22b in plan view. Almost all rays of light reflected by the diffuser lenses 19 toward the LED boards 18 or traveling from the spaces outside the diffuser lenses 19 in plan view to the inside of the holes 22b can be directed to the diffuser lenses 19 by the board-side reflection sheet 23. With this configuration, light use efficiency can be improved and thus the brightness can be improved. Namely, a sufficient level of brightness can be achieved even the number of the LEDs 17 is reduced for a cost reduction.

Each board-side reflection sheet 23 has LED insertion holes 23, which are through holes through which the respective LEDs 17 are passed, at locations overlapping the respective LEDs 17 on the corresponding LED board 18 in plan view. Furthermore, the board-side reflection sheet 23 has leg insertion holes 23b, which are through holes through which the respective mounting legs 19d of the corresponding diffuser lens 19 are passed, at locations overlapping the mounting legs 19d in plan view. Still furthermore, the board-side reflection sheet 23 has connector insertion holes 23d, which are through holes through which the respective connectors 25 are passed, at the ends of long side thereof. When the board-side reflection sheet 23 is overlaid on the mounting surface 18a of the LED board 18, the LEDs 18, the mounting legs 19d of the diffuser lenses 19, and the connectors 25 are inserted in the holes 23a, 23b, and 23d, respectively. Therefore, they do not conflict each other.

Next, board holding members 20 and sheet holding members 24 will be explained. First, arrangements of the holding members 20, 24 in the chassis 14 will be explained. As illustrated in FIG. 3, the holding members 20, 24 are arranged in multiple lines parallel to one another within a plane of the bottom plate 14a of the chassis 14. Specifically, the holding members 20, 24 are arranged in a matrix with the row direction aligned with the X-axis direction (the long-side direction of the chassis 14 or the LED board 18) and the column direction aligned with the Y-axis direction (the short-side direction of the chassis 14 or the LED board 18). The holding members 20, 24 are arranged at locations overlapping the corresponding LED board 18 in plan view and between the adjacent diffuser lenses 19 (or the LEDs 17). Namely, the holding members 20, 24 are arranged similarly to the diffuser lenses 19 and the LEDs 17 described earlier. The holding members 20, 24 are arranged one at each area between the adjacent diffuser lenses 19 (or the LEDs 17) on the LED board 18. Namely, the diffuser lenses 19 (or the LEDs 17) and the holding members 20, are alternately arranged along the X-axis direction. Specifically, four holding members 20, 24 are mounted to each LED board 18. More specifically, the holding members 20, 24 are arranged in areas between the adjacent diffuser lenses 19 (or the LEDs 17) except for the middle of the long side of each six-LED-type LED board 18. The holding members 20, 24 are arranged in all areas between the adjacent diffuser lenses 19 (the LEDs 17) on each five-LED-type LED board 18.

Among the holding members 20, 24 arranged in the matrix inside the chassis 14 as described above, a plurality of the sheet holding members 24 (specifically 14 of them) are arranged discontinuously in zigzag. The board holding members 20 are arranged at other locations. In the central area with respect to the X-axis direction inside the chassis 14 (i.e., the area in which the five-LED-type LED boards 18 area arranged), four sheet holding members 24 are arranged in areas of the respective LED boards 18 close to the center with respect to the long-side direction so as to be in zigzag in plan view. In each of the side areas with respect to the X-axis direction inside the chassis 14 (i.e., the areas in which the six-LED-type LED boards 18 are arranged), five sheet holding members 24 are arranged in areas of the respective LED boards 18 close to edges with respect to the long-side direction so as to be in zigzag in plan view. A plurality of the sheet holding members 24 are moderately arranged in dispersed locations within the bottom plate 14a of the chassis 14. The board holding members 20 are attached to all LED boards 18 inside the chassis 14, respectively. The sheet holding members 24 are attached to the specific LED boards 18 in the corresponding locations.

Figure 9:
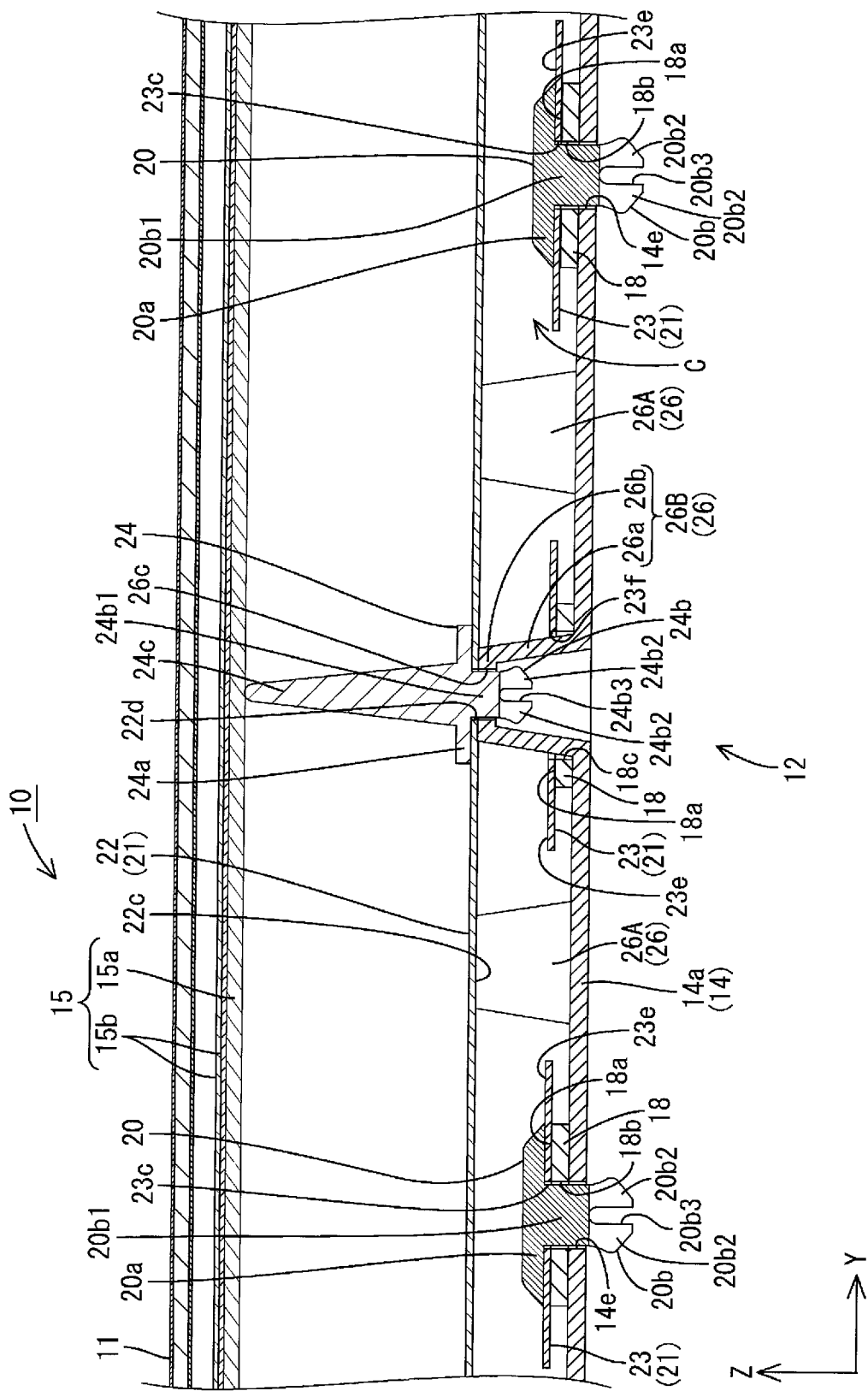
FIG. 9 is a cross-sectional view along line ix-ix in FIG. 6.

Next, detailed configurations of the board holding members 20 will be explained. Detailed configurations of the sheet holding members 24 will be explained later. Each board holding member 20 is made of synthetic resin such as polycarbonate with white surfaces having high light reflectivity. The board holding member has a substantially round plan-view shape. As illustrated in FIG. 9, the board holding member 20 includes a body portion 20a and a fixing portion 20b. The body portion 20a is along the plate surfaces of the bottom plate 14a of the chassis 14 and the LED board 18. The fixing portion 20b project from the body portion 20a toward the rear, that is, toward the chassis 14 and fixed to the chassis 14. The board holding member 20 has a symmetric overall shape, which is symmetric about a center axis along the Z-axis.

Figure 12:
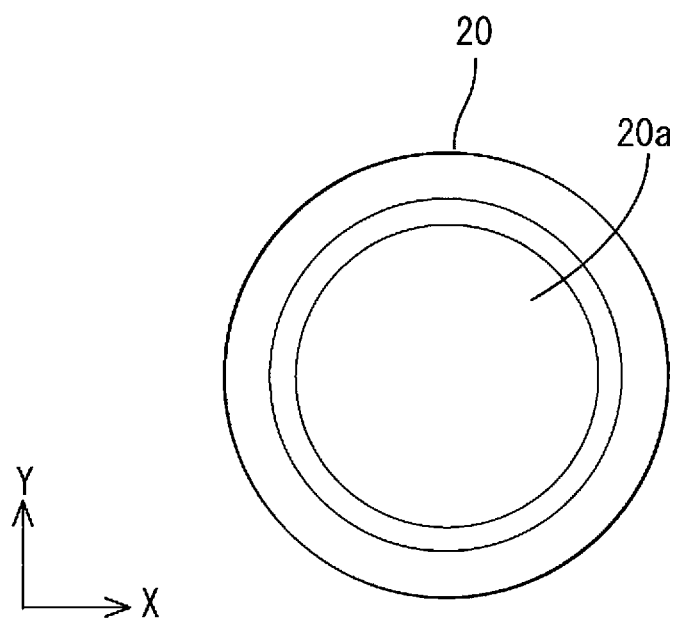
FIG. 12 is a plan view of a board holding member.
Figure 13:
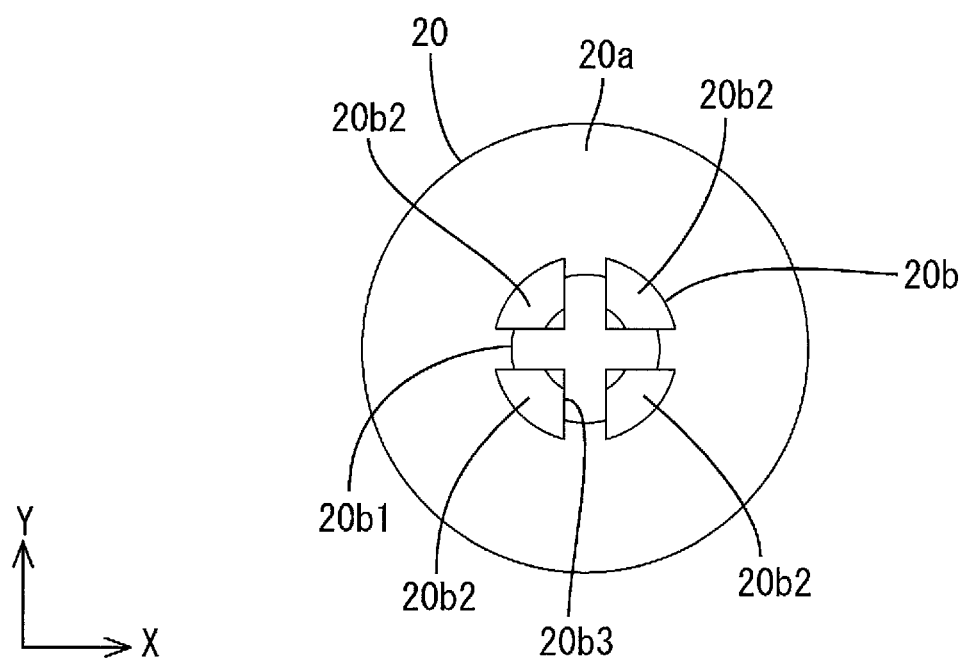
FIG. 13 is a bottom view of the board holding member.
Figure 14:
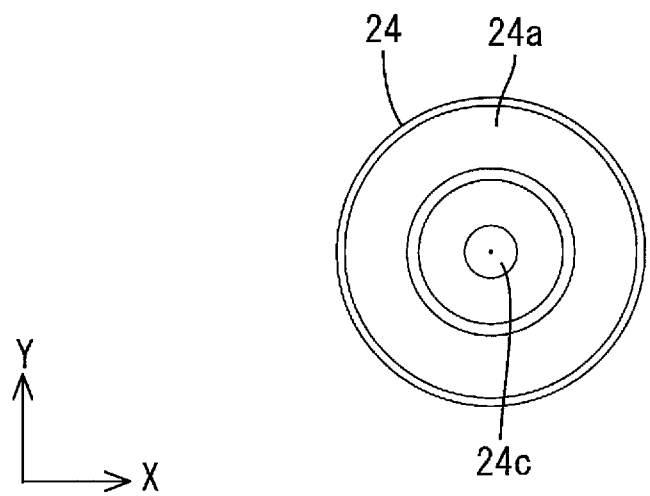
FIG. 14 is a plan view of a sheet holding member.
Figure 15:
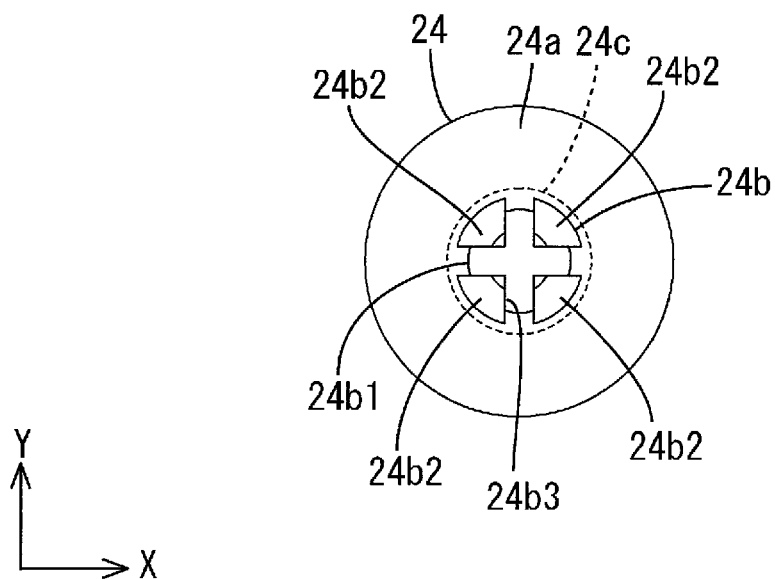
FIG. 15 is a bottom view of the sheet holding member.

As illustrated in FIGS. 12 and 13, the body portion 20a has a substantially round plan-view shape and a substantially flat plate-like shape along the X-axis direction and the Y-axis direction. As illustrated in FIG. 6, the body portion 20a has a diameter substantially the same as the short dimension (the dimension measuring in the Y-axis direction) of the LED board 18. With the body portion 20a mounted at a location overlapping the LED board 18 in plan view, the LED board 18 is sandwiched between the body portion 20a and the bottom plate 14a of the chassis 14.

As illustrated in FIG. 9, the body portion 20a is mounted with the board-side reflection sheet 23 arranged on the front side of the LED board 18. Therefore, the LED board 18 and the board-side reflection sheet 23 are collectively held by the body portion 20a. Namely, the board holding member 20 according to this embodiment can sandwich the board-side reflection sheet 23 and the LED board 18, which are overlaid on each other, with the chassis 14. When the board holding member 20 is mounted, the front surface of the body portion 20a is more to the rear (on the LED board 18 side) than the diffuser lenses 19.

As illustrated in FIG. 6, the body portion 20a is arranged such that the center thereof is at the center of the short side of the LED board 18. Therefore, the body portion 20a can hold the LED board 18 for an entire short length of the LED board 18 between the body portion 20a and the chassis 14. The diameter of the body portion 20a is smaller than the distance (or the interval) between the diffuser lenses 19 (or the LEDs 17) adjacently arranged with respect to the X-axis direction. The body portion 20a is arranged in an area of the LED board 18 between the diffuser lenses 19 (or the LEDs 17) adjacently arranged with respect to the X-axis direction, that is, in a non-luminous area of the LED board 18. Namely, the body portion 20a does not overlap the LED 17 in plan view. Moreover, the body portion 20a does not block light from the LED 17. In this embodiment, the sufficiently large distance can be obtained between the LEDs 17 because the diffuser lenses 19 are used as described earlier. The board holding members 20 are arranged in spaces between the LEDs 17 and the LEDs 18 are fixed by the board holding members 20.

As illustrated in FIG. 9, each fixing portion 20b is passed through the mounting hole 14e and held to the bottom plate 14a of the chassis 14. The mounting hole 14e is formed in an area of the bottom plate 14a of the chassis 14 corresponding to the mounting location of the board holding member 20 in the bottom plate 14a. A detailed configuration of the fixing portion 20b will be explained below. As illustrated in FIG. 13, the fixing portion 20b is arranged at the center of the body portion 20a. Specifically, the fixing portion 20b is arranged at a position such that it is substantially concentric with the body portion 20a. As illustrated in FIG. 9, the fixing portion 20b projects from the rear surface (the surface facing the chassis 14) of the body portion 20 to the rear. The fixing portion 20b has elastically locking pieces 20b2 at the tip thereof. The elastically locking pieces 20b2 are provided by forming grooves 20b3. The fixing portion 20b includes a base 20b1 and the elastically locking pieces 20b2. The base 20b1 projects from the body portion 20a to the rear. The elastically locking pieces 20b2 project from the distal end of the base 20b1 to the rear. The base 20b1 has a column-like shape and a diameter smaller than that of the mounting hole 14e of the chassis 14 such that the base 20b1 can be passed through the mounting hole 14e.

As illustrated in FIG. 13, the grooves 20b3 has a cross-like plan view shape. Namely, four elastically locking pieces 20b2 are provided. As illustrated in FIG. 9, each elastically locking piece 20b2 is formed in a cantilever-like shape. The elastically locking pieces 20b2 are elastically deformable with the base points at which they project from the respective bases 20b1 as support points such that they become closer in the grooves 20b3. Namely, the grooves 20b3 are spaces that allow the deformations of the elastically locking pieces 20b2. A part of each elastically locking piece 20b2 protrudes outward (in an opposite direction to the grooves 20b3). The protruding part is held to an edge of the mounting hole 14e of the chassis 14 from the rear. With this configuration, the board holding member 20 is fixed to the chassis 14 and held in the mounting position. A plurality of the mounting holes 14e are formed at locations corresponding to the mounting locations of the board holding members 20. The mounting holes 14e are arranged parallel to one another in a matrix with a plurality of them in each line along the X-axis direction and in each line along the Y-axis direction.

As illustrated in FIG. 6, the body portion 20a, on which the fixing portion 20b is provided, is arranged such that the entire area thereof overlap the LED board 18 in plan view. Therefore, the fixing portion 20b also overlap the LED board 18 in plan view. The LED board 18 has through holes 18b through which the fixing portions 20b are passed. As illustrated in FIG. 10, the through holes 18b are formed in areas of the LED board 18 between the adjacent LEDs 17 (or the diffuser lenses 19), that is, areas that do not overlap the LEDs 17 (or the diffuser lenses 19) in plan view. As illustrated in FIGS. 9 and 11, each board-side reflection sheet 23 sandwiched between the body portion 20a and the LED board 18 has through holes 23c that continues into the respective through holes 18b of the LED board 18 and through which the respective fixing portions 20b are passed. The through holes 23c are formed in areas of the LED board 18 overlapping the respective through holes 18b of the LED board 18 in plan view.

In this embodiment, the single-side mounting boards 18 are used. As described earlier, the LEDs 18 and the connectors 25 are mounted on the same mounting surface 18a of each LED board 18. When such single-side mounting boards 18 are used, the following problem may occur. The connectors 25 are mounted on the mounting surface 18a of each LED board 18 and a surface level difference may be created between the connectors 25 and the mounting surface 18a. If the chassis-side reflection sheet 22 is placed over the board-side reflection sheet 23 placed over the mounting surface 18a, the chassis sheet 22 may be lifted by the connectors 25 and more likely to deform. If the chassis-side reflection sheet 22 deforms, a variation in uniformity of rays of the reflected light may be produced. As a result, a variation in brightness of the light exiting from the backlight unit 12 may be produced. To avoid such a problem, holes through which the connectors 25 are passed may be provided in the chassis-side reflection sheet 22. By doing so, the connectors 23 may be exposed to the light exit side via the holes, and the light reflectivity are locally reduced in areas in which the holes are provided. As a result, the uniformity in the light reflectivity inside the chassis 14 is reduced and a variation in brightness of the light exiting from the backlight unit 12 may be produced or the brightness may be reduced.

As illustrated in FIGS. 7 to 9, the chassis 14 of this embodiment includes supports 26 that support the chassis sheet 22 from the rear at predetermined positions. Namely, the supports 26 maintain a positional relationship between the LED board 18 or the board-side reflection sheet 23 and the chassis-side reflection sheet 22 with respect to the Z-axis direction (the direction perpendicular to the board surfaces of the LED board 18 and the chassis-side reflection sheet 22). The supports 26 are integrally formed with the bottom plate 14a of the chassis 14. The supports 26 project to the front. The distal end surfaces of the supports 26 are in contact with the rear surface 22c of the chassis-side reflection sheet 22 (the surface facing the LED boards 18). As a result, the rear surface 22c of the chassis sheet 23 is held at a position a predetermined distances away from the mounting surfaces 18a of the LED boards 18 and the front surface 23e of the board-side reflection sheet 23 that is place over the mounting surfaces 18a on the front side. Therefore, the chassis-side reflection sheet 22 is held away from the front surfaces 23e of the board-side reflection sheets 23 (or the mounting surfaces 18a of the LED boards 18) and maintained in a non-contact position while keeping its overall flatness. Furthermore, a clearance C is produced between the chassis-side reflection sheet 22 and the board-side reflection sheet 23 (or the LED boards 18).

Specifically, each support 26 is prepared by protruding a part of the bottom plate 14a toward the front through drawing, for example. A height of each support 26 measured from the bottom plate 14a is larger than a total of the thickness of the LED board 18 and the height of the diffuser lens 19. Namely, the distal end surface of each support 26 (the support surface supporting the chassis-side reflection sheet 22) is located further closer to the front than the diffuser lenses 19 that are components projecting the farthest to the front among the components arranged on more to the front than the mounting surface 18a of the LED board 18 (the LEDs 17, the diffuser lenses 19, the board holding members 20, the board-side reflection sheets 23, and the connectors 25). With the supports 26, the chassis-side reflection sheet 22 is arranged away from the front surfaces of the components (the LEDs 17, the diffuser lenses 19, the board holding members 20, the board-side reflection sheets 23, and the connectors 25) arranged more to the front than the mounting surfaces 18a of the LED boards 18 with predetermined clearances, respectively. Moreover, the chassis-side reflection sheet 22 is held in the non-contact position by the supports 26. The chassis-side reflection sheet 22 is less likely to be lifted by the components and thus does not locally deform. All components arranged more to the front than the mounting surfaces 18a of the LED boards 18 are placed in the clearances C between the chassis-side reflection sheet 22 and the board-side reflection sheets 23 without projecting toward the front. The chassis-side reflection sheet 22 is arranged more to the rear than the chassis-side reflection sheet 22. Therefore, the diameter of each hole 22b of the chassis-side reflection sheet 22 is sufficiently large to pass the rays of light exiting the diffuser lenses 19 arranged more to the rear than the chassis-side reflection sheet 22 without being blocked.

Each support 26 has a cone-like shape with a diameter gradually decreasing from the base of protrusion toward the distal end. An overall shape of the support 26 is a circular truncated cone-like shape. Because of the shape, the support 26 can be easily formed by drawing. The support 26 includes a peripheral wall 26a and a support wall 26b. The peripheral wall 26a rises from the bottom plate 14a. The support wall 26b is provided at a top edge of the peripheral wall 26a. The peripheral wall 26a is angled with respect to the Z-axis and in a cylinder-like shape. The support wall 26b has a plate-like shape substantially flat along the X-axis direction and the Y-axis direction (the plate surface of the chassis-side reflection sheet 22). The support wall 26b includes a support surface that supports the chassis-side reflection sheet 22.

A plurality of the supports 26 are arranged at dispersed locations inside the chassis 14. Two kings of the supports 26 are provided according to the locations inside the chassis 14. The supports 26 include first supports 26A and second supports 26B. The first supports 26A have only a support function for supporting the chassis-side reflection sheet 22. The second supports 26B have a function for keeping the sheet holding members 24 in the mounting positions in addition to the above function. The sheet holding members 24 are provided for holding the chassis-side reflection sheet 22. To distinguish the kinds of the supports 26 from each other, letter A is added to the reference number of the first supports and letter B is added to the reference number of the second supports. When they are collectively referred without being distinguished, no letter is added to the number.

As illustrated in FIGS. 3, 6, 8, and 16, the first supports 26A are arranged in areas of the bottom plate 14a of the chassis 14 not overlapping the LED boards 18 in plan view. Specifically, the first supports 26A are arranged in the areas of the bottom plate 14a between the LED boards 18 adjacently arranged with respect to the Y-axis direction. Furthermore, a plurality of the first supports 26A are arranged parallel to one another along the Y-axis direction, that is, the outer edge of the long side of the LED board 18 with clearances. More specifically, the first supports 26A are arranged in areas between the board-side reflection sheets 23 with respect to the Y-axis direction (areas that do not overlap the board-side reflection sheets 23 in plan view). The board-side reflection sheets 23 are placed on the respective LED boards 18. A pair of the first supports 26A is arranged such that the corresponding LED board 18 is sandwiched between the first supports 26A with respect to the short-side direction of the LED board 18 (the X-axis direction) in plan view (except for the LED boards 18 located at either end with respect to the Y-axis direction inside the chassis 14). The distance (or the interval) between the first supports 26A adjacently arranged with respect to he X-axis direction is substantially equal to the distance between the LEDs 17 (or the diffuser lenses 19) on each LED board 18. The arrangement of the first supports 26A with respect to the X-axis direction is substantially the same as that of the LEDs 17. The first supports 26A are arranged in a matrix within the plane of the bottom plate 14a similarly to the LEDs 17. A number of the first supports 26A are evenly arranged at dispersed locations. Therefore, the body portion 22a of the chassis-side reflection sheet 22 can be evenly and properly supported. As a result, the flatness of the chassis-side reflection sheet 22 can be properly maintained. The first supports 26A do not have mounting holes 26 that are formed in the second supports 26B, which will be explained next. Therefore, the sheet holding members 24 can be attached. The first supports 26A are board non-overlapping supports arranged in areas that do not overlap the LED boards 18 in plan view and non-hole including supports that do not have the mounting holes 26c.

As illustrated in FIGS. 7 and 9, the second supports 26B are arranged in the bottom plate 14a of the chassis 14 so as to overlap the LED boards 18 in plan view. Specifically, each second support 26B is arranged in an area overlapping an area of the LED board 18 between the adjacent diffuser lenses 19 (in the non-luminous area) in plan view. The LED boards 18 and the board-side reflection sheets 23 corresponding to the second supports 26B have through holes 18c and 23f, respectively. The second supports 26B are passed through the through holes 18c and 23f. The through holes 18c and 23f are round holes in plan view. A diameter of each through holes 18c or 23f is slightly larger than the outer diameter of the second support 26B. The second support 26B is arranged at the center of the short dimension of the LED board 18 with respect to the Y-axis direction, that is, in the substantially same location as the LED 17 (or the diffuser lens 19). The chassis-side reflection sheet 22 is supported by the second supports 26 from the rear side in the areas overlapping the LED boards 18 in plan view. Because the areas of the chassis-side reflection sheet 22 is also supported by the first supports 26A in the areas not overlapping the LED boards 18, the chassis-side reflection sheet 22 remains flat.

Figure 16:
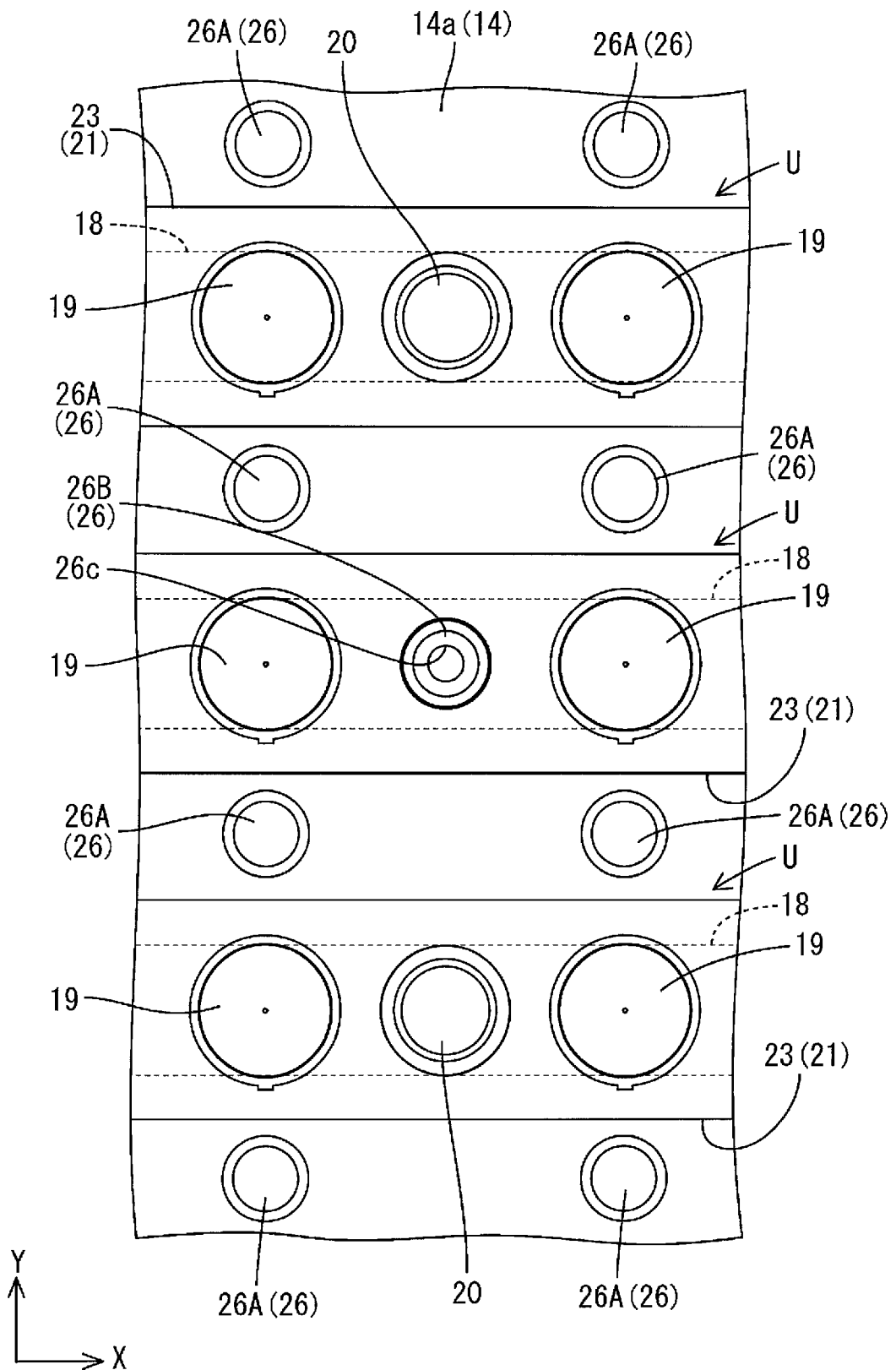
FIG. 16 is a plan view illustrating the light source unit arranged inside the chassis and the board holding member attached thereto.

As illustrated in FIGS. 6 and 16, the locations of the second supports 26B within the bottom plate 14a are the same as the locations of the sheet holding members 24 described earlier. Namely, a plurality of (total of fourteen) the second supports 26B are arranged discontinuously in zigzag within the plane of the bottom plate 14a. The support wall 26b of each second support 26B has a mounting hole 26c that is a through hole for mounting the sheet holding member 24. The chassis-side reflection sheet 22 is sandwiched (or held) between the support walls 26b of the second supports 26B and the sheet holding members 24. The second supports 26B are board-overlapping supports arranged so as to overlap the LED boards 18 in plan view. The second supports 26B are also supports with holes having the mounting holes 26c.

Next, the configuration of the sheet holding members 24 will be explained in detail. Each sheet holding member 24 is made of synthetic resin with white surfaces having high light reflectivity. The sheet holding member 24 has a round overall shape in plan view. As illustrated in FIGS. 7, 9, 14, and 15, the sheet holding member 24 includes a body portion 24a, a fixing portion 24b, and a diffuser plate support portion 24c. The body portion 24a is along the board surface of the support wall 26b of the second support 26B. The fixing portion 24b projects from the body portion 24a toward the rear, that is, toward the second support 26B. The fixing portion 24b is fixed to the second support 26B. The diffuser plate support portion 24c projects from the body portion 24a toward the front, that is, toward the opening 14b, and supports the diffuser plate 15a. The detailed configurations of the body portion 24a and the fixing portion 24b are similar to the body portion 20a and the fixing portion 20b of the board holding member 20 described earlier. The similar configuration will not be explained. Similar to the fixing portion 20b, the fixing portion 24b includes a base 24b1, an elastically locking pieces 24b2, and grooves 24b3. The elastically locking pieces 24b2 are elastically locked to the edge of the mounting hole 26c of the second support 26B. The chassis-side reflection sheet 22 is sandwiched between the body portion 24a and the second support 26B. The diffuser plate support portion 24c will be explained below.

The diffuser plate support portion 24c has a cone-like overall shape. Specifically, the body portion 24a has a round cross section cut along the board surface of the body portion 24a. The body portion 24a is formed in a cone-like shape with the diameter gradually decreasing from the base of projection toward the distal end. The diffuser plate support 24c is in contact with the diffuser plate 15a of the optical member 15 arranged the closest to the rear (or the LED 17). The diffuser plate 15a is supported at a specified position. Namely, the diffuser plate 24c controls the positional relationship between the diffuser plate 15a and the LEDs 17 with respect to the Z-axis direction (the direction perpendicular to the surface of the diffuser plate 15a). The diffuser plate support 24c is the only part of the sheet holding member 24 projecting toward the front. Therefore, during mounting of the sheet holding member 24 to the chassis 14, a person doing the mounting can use the diffuser plate support 24c as a holding part. This improves the workability of mounting and removing of the sheet holding member 24.

This embodiment has the above configurations. Next, operation of this embodiment will be explained. The liquid crystal panel 11 and the backlight unit 12 are separately manufactured and assembled together with the bezel 13. As a result, the liquid crystal display device 10 illustrated in FIGS. 4 and 5 is manufactured. The assembly process of the backlight unit 12 will be explained in detail.

In this embodiment, the LEDs 17, the board-side reflection sheet 23, and the diffuser lenses 19 are mounted to the LED boards 18 in advance to the mounting process of the components to the chassis 14. First, the LEDs 17 and the connectors 25 are mounted to the mounting surface 18a of each LED board 18 at the specified locations as illustrated in FIG. 10. Then, the board-side reflection sheet 23 is attached to the front surface. In this process, the LEDs 17 are passed through the LED insertion holes 23a of the board-side reflection sheet 23 and the connectors 25 are passed through the connector insertion hole 23d of the board-side reflection sheet 23. Furthermore, the through holes 18b of the LED board 18 and the through holes 23c of the board-side reflection sheet 23 are aligned. The through holes 18c of the LED board 18 and the through holes 23f of the board-side reflection sheets 23 corresponding to the second supports 26B are aligned and connected. As illustrated in FIG. 11, the diffuser lenses 19 are mounted to the LED 18 so as to cover the respective LEDs 17. The mounting legs 19d of each diffuser lens 19 are passed through the leg insertion holes 23b of the board-side reflection sheet 23 and fixed to the LED board 18 with an adhesive. Through the above process, a light source unit U including LEDs 17, the board-side reflection sheet 23 and the diffuser lenses 19 mounted on the LED board 18 is manufactured.

Figure 17:
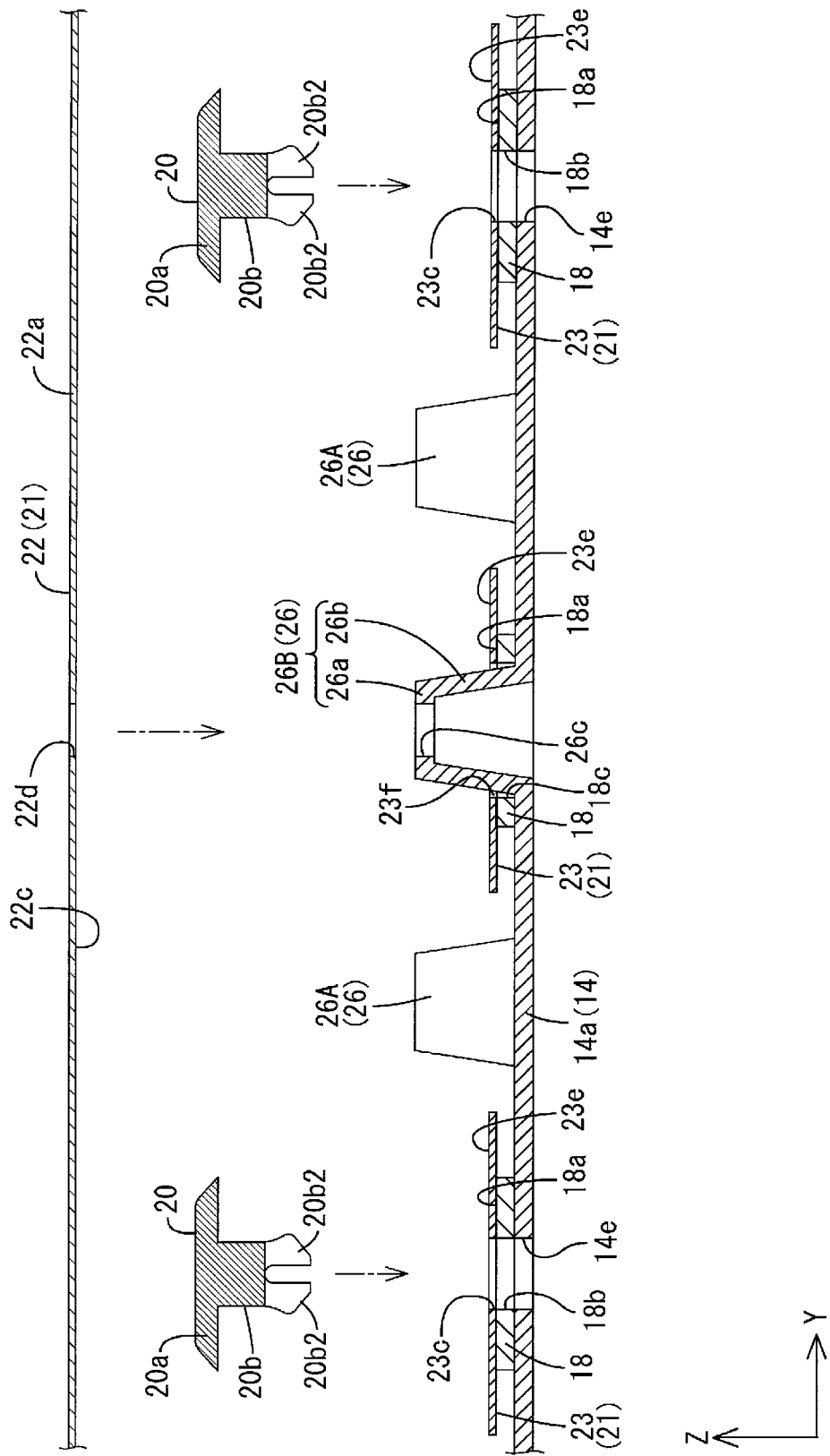
FIG. 17 is a cross-sectional view illustrating the light source unit arranged inside the chassis, and the board holding member and the chassis-side reflection sheet before attached thereto along line ix-ix in FIG. 6.
Figure 18:
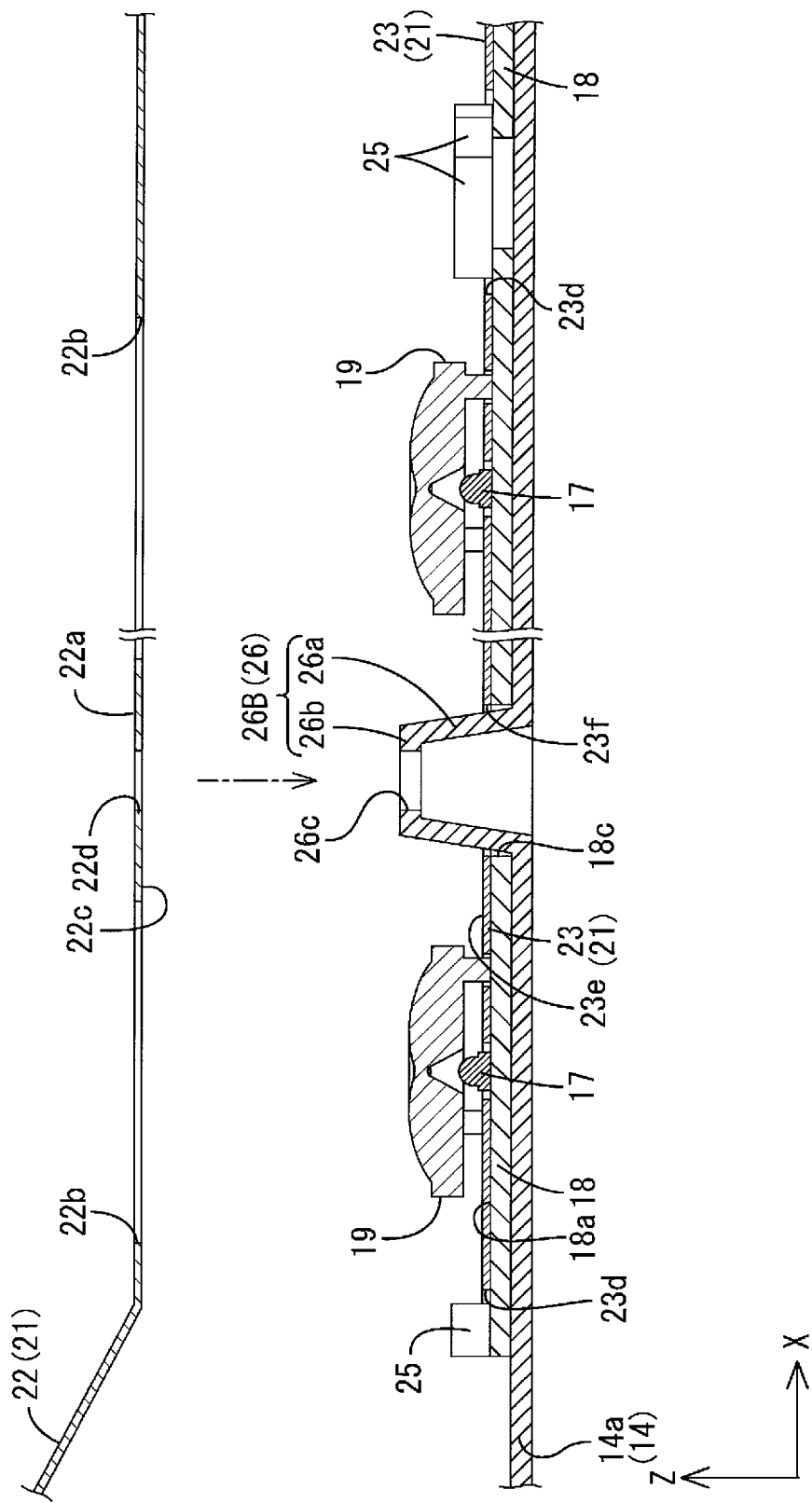
FIG. 18 is a cross-sectional view illustrating the light source unit arranged inside the chassis, and the chassis-side reflection sheet before attached thereto along line vii-vii in FIG. 6.

Next, the mounting process of the components to the chassis 14 will be explained. The light source units U are inserted in the inside of the chassis 14 from the front side through the opening 14b and arranged at the specified locations within the bottom plate 14a. The light source units U are arranged adjacently to the first supports 26A arranged along the X-axis direction with respect to the Y-axis direction within the bottom plate 14a. In the through holes 18c and 23f of the light source unit U corresponding to the second supports 26B, the second supports 26B are inserted when the light source unit U are inserted. The second supports 26B are in contact with the edges of the through holes 18c and 23f. As illustrated in FIGS. 16 to 18, the light source units U (including the LED boards 18 and the board-side reflection sheets 23) are two-dimensionally positioned relative to the chassis 14 with respect to the X-axis direction and the Y-axis direction. Furthermore, the through holes 18b and 23c of the light source units U are aligned with the mounting holes 14e of the bottom plate 14a. The LED boards 18 adjacently arranged with each other with respect to the X-axis direction are electrically connected to each other when the adjacent connectors 25 are engaged. The connecting process for connecting adjacent connectors 25 of the LED boards 18 adjacently arranged with respect to the X-axis direction is not necessary to be performed inside the chassis 14. It may be performed outside the chassis 14.

Figure 19:
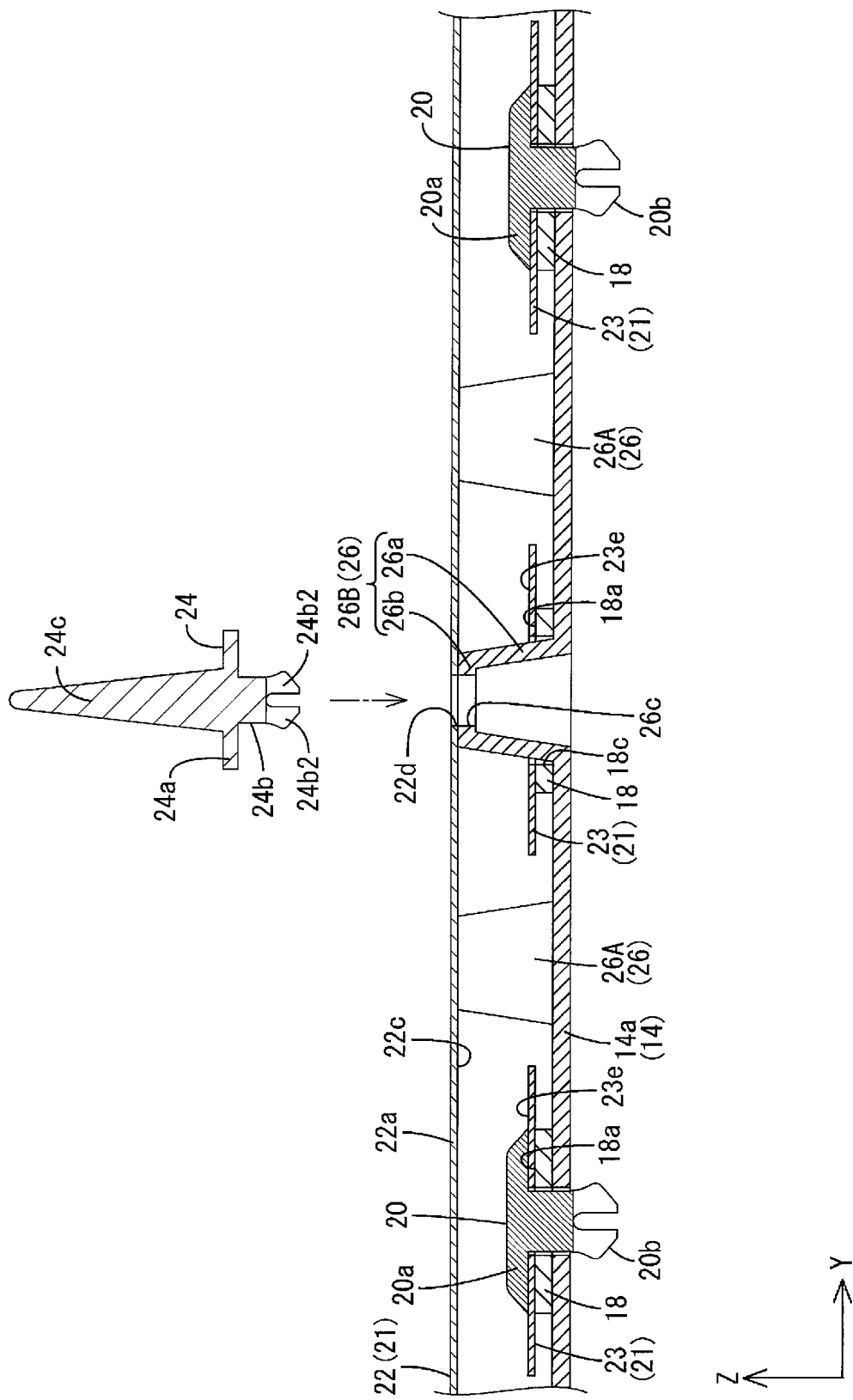
FIG. 19 is a cross-sectional view illustrating the light source unit arranged inside the chassis, the board holding member and the chassis-side reflection sheet attached thereto, and the sheet holding member before attached thereto along line ix-ix in FIG. 6.

After the LED boards 18 are inserted in the chassis 14, the board holding members 20 are mounted. Each board mounting member 20 is moved from a position illustrated in FIG. 17 and inserted in the chassis 14 from the front side of the chassis 14 via the opening 14b. The fixing portion 20b is inserted in the holes 14e, 18b, and 23c. In the insertion process of the fixing portion 20b, the elastically locking pieces 20b2 are pressed by the edges of the holes 14e, 18b, and 23c and temporarily deformed so as to close the grooves 20b3. When the fixing portion 20b is inserted to the depth such that the elastically locking pieces 20b2 passes through the mounting holes 14e and reaches the back of the chassis 14, the elastically locking pieces 20b2 elastically restore as illustrated in FIG. 19. Furthermore, the bulge sections of the elastically locking pieces 20b2 are held to the edge of the mounting hole 14e from the rear. As a result, the board holding member 20 is restricted from coming off of the chassis 14 and held in the mounted position. The LED board 18 and the board-side reflection sheet 23 are collectively sandwiched between the body portion 20a of the board holding member 20 and the bottom plate 14a of the chassis 14.

Figure 20:
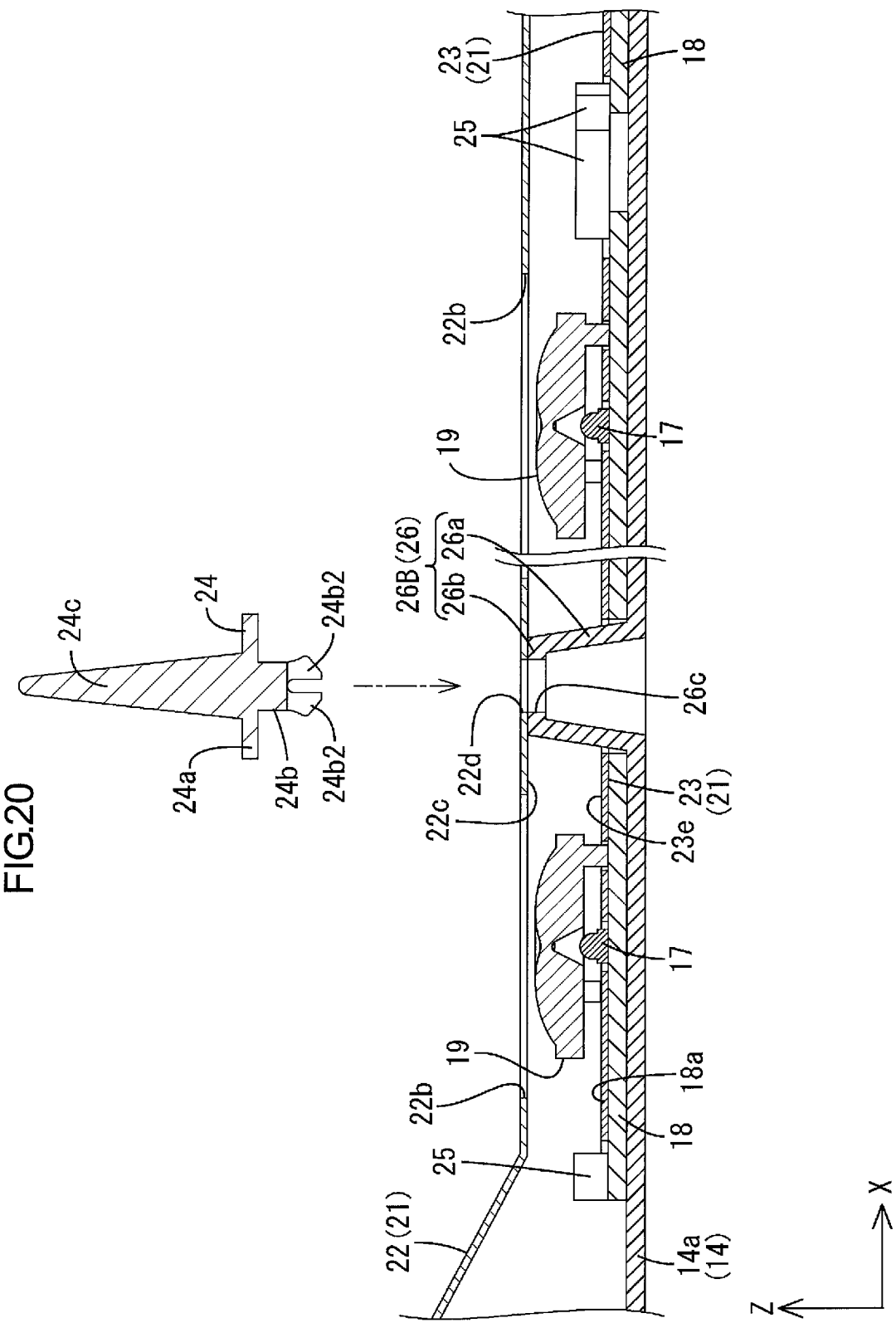
FIG. 20 is a cross-sectional view illustrating the chassis-side reflection sheet attached thereto, and the sheet holding member before attached thereto along line vii-vii in FIG. 6.

Next, the chassis-side reflection sheet 22 is arranged inside the chassis 14. The chassis-side reflection sheet 22 is placed inside the chassis 14 such that the holes 22b are aligned with the diffuser lenses 19 of the light source units U and the through holes 22d are aligned with the mounting holes 26c of the second supports 26B. The first supports 26A and the second supports 26B are provided inside the chassis 14. As illustrated in FIGS. 19 and 20, when the chassis-side reflection sheet 22 is placed, the first supports 26A and the second supports 26b are brought in contact with the rear surface 22c of the main part 22a of the chassis-side reflection sheet 22 from the rear. With this configuration, the chassis-side reflection sheet 22 is held at the specified position with respect to the Z-axis direction inside the chassis 14. As illustrated in FIG. 3, a number of the supports 26A and 26B are evenly arranged in dispersed locations within the plane of the bottom plate 14a of the chassis 14. Therefore, the main part 22a of the chassis-side reflection sheet 22 are evenly supported by the supports 26A and 26B for the entire area thereof. Namely, the main part 22a remains with a high level of flatness without a warp or a distortion as a whole. In this placement condition, the chassis-side reflection sheet 22 is held at a position more to the front than the components (the LEDs 17, the diffuser lenses 19, the board holding members 20, the board-side reflection sheet 23, and the connectors 25) mounted on the front mounting surface 18a of the LED boards 18. The chassis-side reflection sheet 22 does not touch or interfere with the components. If the chassis-side reflection sheet 22 is overlaid on the front of the board-side reflection sheets 23 that is placed over the mounting surfaces 18a of the LED boards 18, it may be lifted by the connectors 25 projecting from the front surface 23e. As a result, local deformations may occur in the chassis-side reflection sheet 22. According to this embodiment, the chassis-side reflection sheet 22 is held at the above-described position. Therefore, the local deformations due to the connectors 25 do not occur. The diffuser lenses 19 are arranged in the holes 22b and the through holes 22d are aligned with the respective mounting holes 26c.

After the chassis-side reflection sheet 22 is inserted in the chassis 14, the mounting of the sheet holding members 24 is performed. A person doing the mounting can use the diffuser plate support 24c of each sheet holding member 24 as a holding part. Each sheet holding member 24 is moved from the position illustrated in FIGS. 19 and 20 and inserted in the chassis 14 from the front side through the opening 14b. The fixing portion 24b is inserted in the holes 22d and 26c. In the insertion process of the fixing portion 24b, the elastically locking pieces 24b2 are pressed by the edges of the holes 22d and 26c. As a result, the elastically locking pieces 24b2 are temporarily deformed so as to close the grooves 24b3. When the fixing portion 24b is inserted to the depth such that the elastically locking pieces 24b2 passes through the mounting holes 26c and reaches the back of the second support 26B, the elastically locking pieces 24b2 elastically restore as illustrated in FIGS. 7 and 9. Furthermore, the bulge sections of the elastically locking pieces 24b2 are held to the edge of the mounting hole 26c from the rear. As a result, the sheet holding member 24 is restricted from coming off of the chassis 14 and held in the mounted position. The main portion 22a of the sheet-mounted reflection sheet 22 is sandwiched between the body portion 24a of the sheet holding member 24 and the support walls 26b of the second support 26B.

Then, the optical member 15 is attached to the chassis 14 so as to cover the opening 14b. Steps of attaching the components of the optical member 15 include the first step in which the diffuser plate 15a is attached and the second step in which the optical sheet 15b is attached. As illustrated in FIGS. 4 and 5, the outer edges of the optical member 15 are received by the receiving plates 14d of the chassis 14, and the central area thereof are supported by the diffuser plate supports 24c of the sheet holding members 24. When the frame 16 is mounted to the chassis 14, the outer edges of the optical member 15 are sandwiched between the frame 16 and the receiving plate 14d. Then, the manufacturing of the backlight unit 12 completes. In the assembly of the manufactured backlight unit 12 and the liquid crystal panel 11, the liquid crystal panel 11 is placed on the frame 16 and the bezel 13 is placed over the front of them and screwed. As a result, the liquid crystal panel 11 is sandwiched between the frame 16 and the bezel 13. The liquid crystal panel 11 is integrated with the backlight unit 12. Then, the manufacturing of the liquid crystal display device 10 completes.

When the liquid crystal display device 10 manufactured by the above process is used, the LEDs 17 in the backlight unit 12 are turned on and image signals are sent to the liquid crystal panel 11. According to the above operations, images are displayed on a display screen of the liquid crystal panel 11. To turn on the LEDs 17, power is supplied by a control circuit, which is not illustrated in the drawings. The LEDs 17 on the LED boards 18 adjacently arranged with respect to the X-axis direction and connected by the connectors 25 are collectively driven by the control circuit. As illustrated in FIGS. 7 and 8, rays of light emitted by the LEDs 17 first enter the light entrance surfaces 19a of the diffuser lenses 19. Most of the rays of light enter the sloped surfaces of the light entrance surfaces 19a in the light-entrance-side recess 19c. Therefore, the rays are refracted at wide angles according to the slope angles and enter the diffuser lenses 19b. The rays that enter the diffuser lenses 19 travel through the diffuser lenses 19 and exits from the light exit surfaces 19b. The light exit surfaces 19b are gently curved surfaces and thus the rays are further refracted at the interfaces between the external air layer and the light exit surfaces 19b and exit. In the area of each light exit surface 19b in which the amount of light is the largest, the light-exit-side recess 19e is formed. The light-exit-side recess 19e is formed in a mortar-like shape. The peripheral surface around the light-exit-side recess 19e is a gently curved nearly spherical surface. Therefore, the rays of light can be refracted at the peripheral surface around the light-exit-side recess 19e and exit, or are reflected toward the LED board 18. The rays of light returned to the LED boards 18 are reflected by the board-side reflection sheets 23 toward the diffuser lenses 19 and enter the diffuser lenses 19. Namely, the light is efficiently used. Therefore, high brightness can be achieved.

The light having high directivity emitted by each LED 17 is diffused in a wide-angle range by the diffuser lens 19 and exits. Some rays of the light that exits from the diffuser lens 19 directly enter the diffuser plate 15a and some rays of the light are reflected mainly by the chassis-side reflection sheet 22 and indirectly enter the diffuser plate 15a. Uniformity in distribution of the rays of the light entering the diffuser plate 15a after reflected by the chassis-side reflection sheet 22 depends on the flatness of the chassis-side reflection sheet 22. If a deformation occurs in a part of the chassis-side reflection sheet 22 and the flatness cannot be achieved, rays of the reflected light are not uniform. As a result, rays of light entering the diffuser plate 15a are also not uniform. According to this embodiment, the chassis-side reflection sheet 22 is supported by the supports 26A and 26B arranged in the dispersed locations inside the chassis 14. Therefore, the chassis-side reflection sheet 22 does not interfere with the components (the LEDs 17, the diffuser lenses 19, the board holding members 20, the board-side reflection sheets 23, and the connectors 25) on the front mounting surface 18a of the LED boards 18. Furthermore, the flatness is maintained at a high level. Therefore, ununiformity of the rays of light reflected by the chassis-side reflection sheet 22 is less likely to occur and thus ununiformity of the rays of light entering the diffuser plate 15a is less likely to occur. With the above configurations, the uniformity in distribution of light entering the diffuser plate 15a is maintained at a high level. Therefore, uneven brightness in the light emitted by the backlight unit 12 or the liquid crystal display device 10 is less likely to occur. Namely, high quality display can be provided.

As described above, the backlight unit 12 includes the LEDs 17, the LED boards 18, the connectors 25, the chassis-side reflection sheet 22, and the supports 26. The LEDs 17 are light sources. The LEDs 17 are mounted on the LED boards 18. The connectors 25 are components mounted on the mounting surfaces 18a of the LED boards 18 on which the LEDs 17 are mounted. The chassis-side reflection sheet 22 is arranged on the side close to the mounting surfaces 18a of the LED boards 18 on which the LEDs 17 and the connectors 25 are mounted. The chassis-side reflection sheet 22 reflects light. The supports 26 hold the chassis-side reflection sheet 22 at the position away from the mounting surfaces 18a of the LED boards 18.

The chassis-side reflection sheet 22 is arranged on the side close to the mounting surfaces 18a of the LED boards 18 on which the LEDs 17 and the connectors 25 are mounted. Furthermore, the chassis-side reflection sheet 22 is held by the supports 26 at the position away from the mounting surfaces 18. Because the connectors 25 are mounted on the mounting surfaces 18a of the LED boards 18, the differences in levels are created between the connectors 25 and the mounting surfaces 18a. However, the chassis-side reflection sheet 22, which is arranged on the side close to the mounting surfaces 18a, are held by the supports 26 at the position away from the mounting surfaces 18a. Therefore, the chassis-side reflection sheet 22 is less likely to deform and thus ununiformity in rays of light reflected by the chassis-side reflection sheet 22 is less likely to occur. Furthermore, each LED board 18 is a single-sided mounting board having the mounting surface 18a on which the LEDs 17 and the connectors 25 are mounted. Therefore, the manufacturing cost can be reduced.

To reduce the deformation of the chassis-side reflection sheet 22, holes through which the connectors 25 are passed may be formed in the chassis-side reflection sheet 22. If such a technique is used, the connectors 25 are exposed through the holes. As a result, uniform light reflectivity cannot be achieved. According to this embodiment, the deformation of the chassis-side reflection sheet 22 is reduced without such holes in the chassis-side reflection sheet 22. Therefore, the light reflectivity remains uniform. According to this embodiment, the ununiformity in the rays of reflected light is less likely to occur.

The supports 26 are formed so as to hold the chassis-side reflection sheet 22 at the position away from the surfaces of the connectors 25 away from the LED boards 18. With this configuration, the chassis-side reflection sheet 22 is held by the supports 26 so as not to touch the connectors 25. Therefore, the chassis-side reflection sheet 22 is not deformed by the connectors 25 and thus the flatness of the chassis-side reflection sheet 22 can be properly maintained.

The chassis 14 having the opening 14b through which light from the LEDs 17 exits is provided. The chassis 14 houses the LED boards 18 and the chassis-side reflection sheet 22. Rays of the light emitted by the LEDs 17 on the LED boards 18 directly exits from the opening 14b or indirectly exits from the opening 14b after reflected by the chassis-side reflection sheet 22.

The supports 26 are integrally provided with the chassis 14. The chassis-side reflection sheet 22 is held by the supports 26 integrally provided with the chassis 14. If supports are integrally provided with the LEDs 18, the support points of the supports 26 at which the chassis-side reflection sheet 22 is supported may vary according to errors in mounting of the LED boards 18 to the chassis 14. However, such variations are less likely to occur according to this embodiment.

The supports 26 are integrally provided with the chassis 14. In comparison to supports provided separately from the chassis 14, the number of parts and the number of steps in the assembly process can be reduced. Therefore, the supports 26 can be provided at low cost.

The supports 26 include the second supports 26B that are board-overlapping supports arranged in the locations overlapping the LED boards 18 in plan view. Each LED board 18 has the through hole 18c through which the second support 26B is passed. With the second support 26B passed through the through hole 18c, the LED board 18 can be positioned with respect to the direction along the board surface thereof.

The supports 26 include the first supports 26A that are board-non-overlapping supports arranged in the locations not overlapping the LED boards 18 in plan view. At least a pair of the first supports 26A is provided for each LED board 18. The first supports 26A are arranged so as to sandwich the LED board 18 therebetween in plan view. With the chassis-side reflection sheet 22 by at least a pair of the first supports 26A arranged so as to sandwich the LED board 18, the flatness of the chassis-side reflection sheet 22 can be further properly maintained.

A plurality of the first supports 26A are arranged parallel to one another along the outer edges of the LED boards 18. With the plurality of the first supports 26A arranged parallel to one another along the outer edges of the LED boards 18, the flatness of the chassis-side reflection sheet 22 can be further properly maintained.

The reflection sheet 21 includes the board-side reflection sheets 23 and the chassis-side reflection sheet 22. The board-side reflection sheets 23 are overlaid on the mounting surfaces 18a of the respective LED boards 18. The chassis-side reflection sheet 22 is arranged along the inner surface of the chassis 14 and closer to the opening 14b than the board-side reflection sheet 23. The supports 26 are formed so as to hold the chassis-side reflection sheet 22 away from the surfaces of the board-side reflection sheets 23 close to the opening 14b. In comparison to the chassis-side reflection sheet on the surfaces 23e of the board-side reflection sheet 23 close to the opening 14b, the deformation of the chassis-side reflection sheet 22 is less likely to be caused by the differences in levels between the connectors 23 and the board-side reflection sheet 23. As a result, ununiformity in the rays of light exiting through the opening 14b after reflected by the chassis-side reflection sheet 22 are less likely to occur.

The board holding members 20 for holding the LED boards 18 between the chassis 14 and the board holding members 20. The LED boards 18 on which the connectors 25 are mounted are sandwiched and held between the board holding members 20 and the chassis 14. With this configuration, the positional relationship between the chassis-side reflection sheet 22 and each connector 25 can be further properly maintained.

The chassis-side reflection sheet 22 has the holes 22b through which rays of light at least from the LEDs 17 are passed in the locations overlapping the LEDs 17 in plan view. With this configuration, the rays of light emitted by the LEDs 17 exit through the holes 22b. The chassis-side reflection sheet 22 arranged close to the mounting surfaces 18a of the LED boards 18 on which the LEDs 17 are mounted is less likely to block the rays of light.

The diffuser lenses 19 are mounted on the LED boards 18 in the areas overlapping the LEDs 17. Each diffuser lens 19 diffuse light from the LED 17 and the diffused light is output. Each hole 22b has a size that allows the light at least from the diffuser lens 19 to pass through. With this configuration, the light from each LED 17 is diffused by the diffuser lens 19 and the diffused light is output. Moreover, the diffused light output from the diffuser lens 19 exits through the hole 22b. This further properly reduces the uneven brightness.

The supports 26 are formed so as to hold the chassis-side reflection sheet 22 away from the diffuser lenses 19 on an opposite side to the mounting surfaces 18a of the LED boards 18. With this configuration, the chassis-side reflection sheet 22 is properly held by the supports 26 so as not to touch the diffuser lenses 19. Therefore, the deformation of the chassis-side reflection sheet 22 is not caused by the diffuser lenses 19, and the flatness of the chassis-side reflection sheet 22 can be properly maintained.

The sheet holding members 24 for sandwiching and holding the chassis-side reflection sheet 22 between the supports 26 and the sheet holding members 24 are provided. The chassis-side reflection sheet 22 is sandwiched and held between the supports 26 and the sheet holding members 24. With this configuration, the positional relationship between the connectors 25 and the chassis-side reflection sheet 22 can be properly maintained.

The supports 26 include the second supports 26B that are with-hole supports having the mounting holes 26c. Each sheet holding member 24 includes the body portion 24a and the fixing portion 24b. The chassis-side reflection sheet 22 is sandwiched between each second support 26B and the body portion 24a. The fixing portion 24b protrudes from the body portion 24a. The fixing portion 24b is passed through the mounting hole 26c and held to the edge of the mounting hole 26c. With the fixing portions 24b held to the edges of the mounting holes 26c of the second supports 26B through which the fixing portions 24b are passed, the sheet holding members 24 can be fixed. Namely, other fixing means, such as an adhesive, is not required. Therefore, the sheet holding members 24 can be easily fixed at low cost.

The supports 26 further include the first supports 26A that are without-hole supports not having the mounting holes 26c in addition to the second supports 26B, which are with-hole supports. Because the supports 26 include the first supports 26A not having the mounting holes 26c, the areas of the chassis-side reflection sheet 22 in which the sheet holding members 24 cannot be mounted can be supported. With this configuration, the flatness of the chassis-side reflection sheet 22 can be properly maintained.

A plurality of the LED boards 18 are arranged. The connectors 25, which are connecting components for connecting the adjacent LED boards 18 are used. The LED boards 18 are mounting parts. The deformation of the chassis-side reflection sheet 22 is not caused by the connectors 25, which are the connecting components.

The light sources are the LEDs 17. Therefore, the high brightness can be achieved at low power consumption.

In the above description, the first embodiment of the present invention is explained. The present invention is not limited to the above embodiment. The following modifications may be included in the technical scope of the present invention, for example. In the following modifications, similar parts to those in the above embodiment will be indicated by the same symbols and will not be illustrated or explained.

<First Modification of First Embodiment>

The first modification of the first embodiment will be explained with reference to FIG. 21. The support position at which the chassis-side reflection sheet 22 is altered. The chassis-side reflection sheet 22 is supported by supports 26-1.

Figure 21:
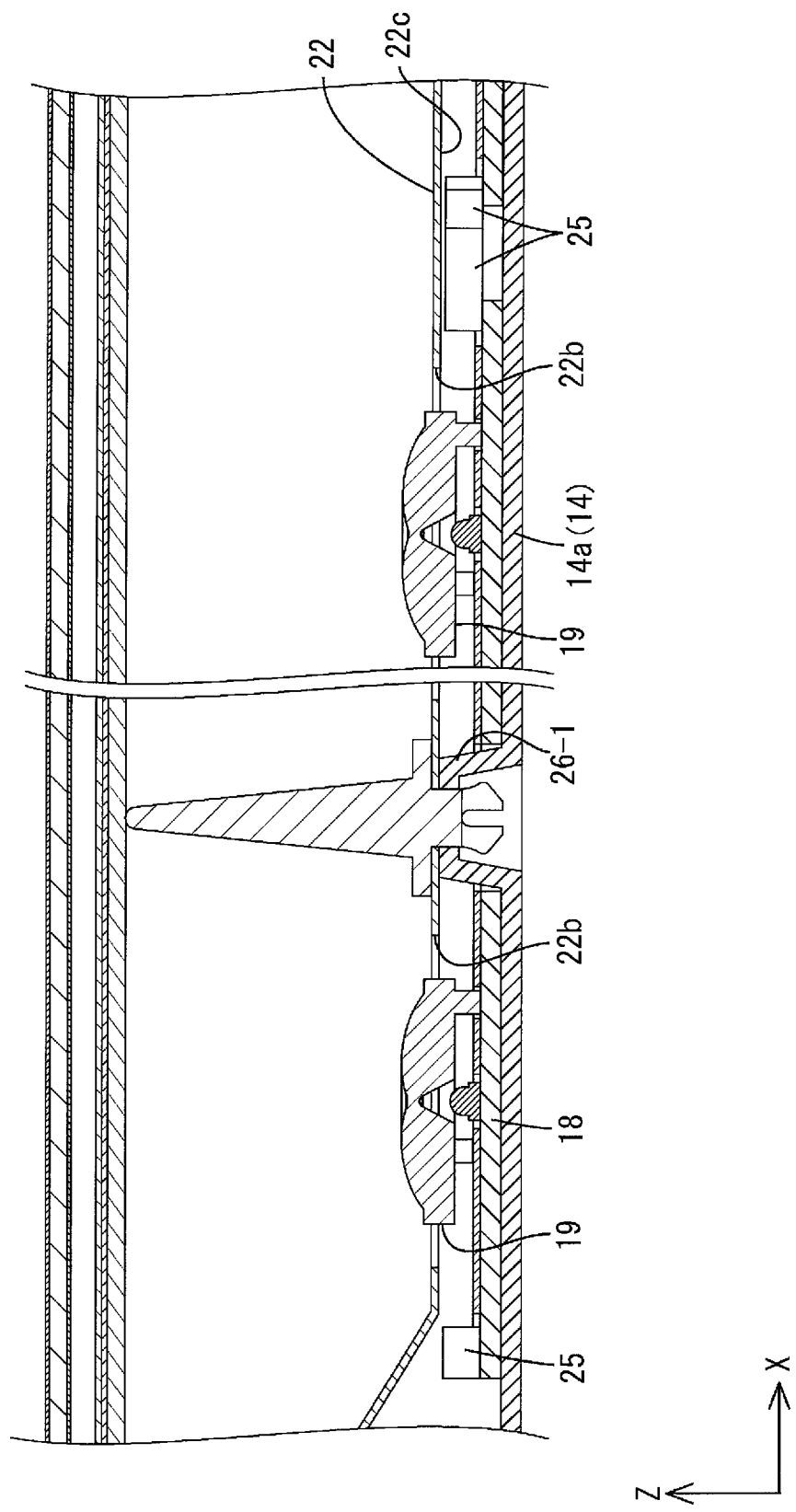
FIG. 21 a cross-sectional view illustrating a holding position of a chassis-side reflection sheet according to a first modification of the first embodiment.

As illustrated in FIG. 21, each hole 22b of the chassis-side reflection sheet 22 has a plan-view size larger than the diffuser lens 19 such that the diffuser lens 19 passes therethrough. Each support 26-1 has a protruding dimension measuring from the bottom plate 14a of the chassis 14 to the distal end thereof smaller than a sum of the thickness of the LED board 18 and the height of the diffuser lens. When the chassis-side reflection sheet 22 is supported by the supports 26-1, the diffuser lenses 19 are inserted in the respective holes 22b. The protruding dimension of each support 26-1 is larger than a sum of the thickness of the LED board 18 and the height of the connector 25. When the chassis-side reflection sheet 22 is supported by the supports 26-1, the rear surface 22c of the chassis-side reflection sheet 22 is more to the front and away from the connectors 25.

According to this modification, each hole 22b is formed in the size so as to allow the diffuser lens 19 to pass through, and the supports 26-1 are formed to hold the chassis-side reflection sheet 22 at a position such that the diffuser lenses 19 are arranged in the respective holes 22b. In comparison to the first embodiment in which the chassis-side reflection sheet 22 is held at the position away from the diffuser lenses 19, a space between the LED boards 18 and the chassis-side reflection sheet 22 can be reduced. As the space becomes larger, a length of light path from a point at which light is reflected by the chassis-side reflection sheet 22 to a point at which the reflected light exits becomes shorter. Therefore, even a slight deformation of the chassis-side reflection sheet 22 tends to cause uneven brightness. According to this modification, the space can be reduced. Therefore, a sufficiently long length of light path from the point at which the light is reflected by the chassis-side reflection sheet 22 to the point at which the reflected light exits can be obtained. Even when the chassis-side reflection sheet 22 has a slight deformation, the deformation is less likely to cause uneven brightness.

<Second Modification of First Embodiment>

The second modification of the first embodiment will be explained with reference to FIG. 22. The support position at which the chassis-side reflection sheet 22 is further altered. The chassis-side reflection sheet 22 is supported by supports 26-2.

Figure 22:
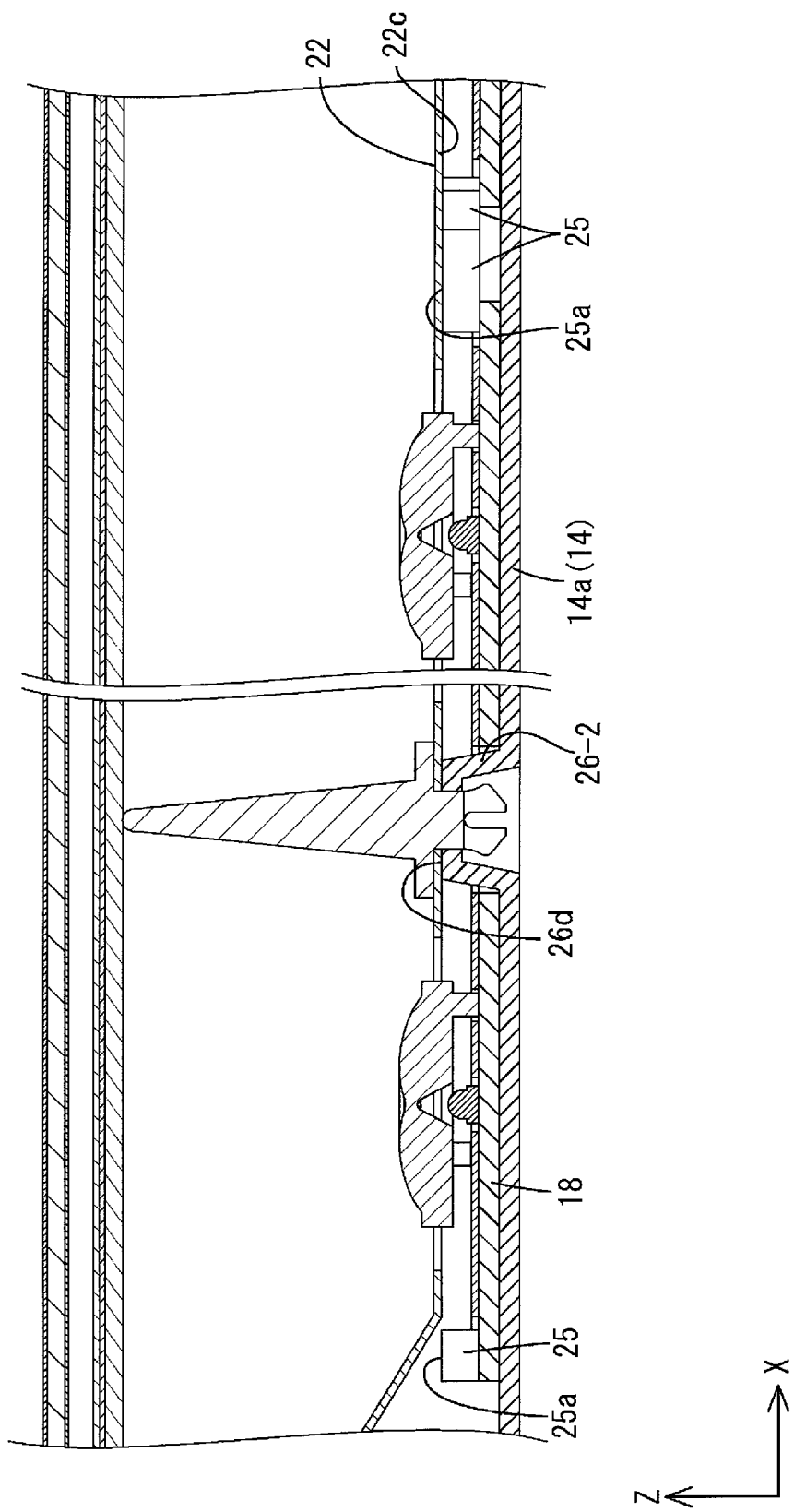
FIG. 22 is a cross-sectional view illustrating a holding position of a chassis-side reflection sheet according to a second modification of the first embodiment.

As illustrated in FIG. 22, each support 26-2 has a protruding dimension measuring from the bottom plate 14a of the chassis 14 to the distal end thereof is substantially equal to a sum of the thickness of the LED board 18 and the height of the connector 25. Namely, a support surface 26d of the support 26-2 with which the chassis-side reflection sheet 22 is supported and the front surface 25a of the connector 25 are on the same plane. Therefore, when the chassis-side reflection sheet 22 is supported by the supports 26-2, the rear surface 22c of the chassis-side reflection sheet 22 and the front surfaces 25a of the connectors 25 are held on the same plane. In this condition, the chassis-side reflection sheet 22 is held with high flatness similar to that in the first embodiment.

According to this modification, the supports 26-2 are formed so as to hold the chassis-side reflection sheet 22 on the plane on which the surfaces 25a of the connectors 25 away from the LED boards 18 are positioned. With this configuration, a space between the LED boards 18 and the chassis-side reflection sheet 22 can be made as small as possible while the flatness of the chassis-side reflection sheet 22 can be maintained by the supports 26-2. Therefore, a sufficiently long length of light path from a point at which light is reflected by the chassis-side reflection sheet 22 to a point at which the reflected light exits can be obtained. Even when the chassis-side reflection sheet 22 has a light deformation, the deformation is less likely to cause uneven brightness.

<Second Embodiment>

The second embodiment of the present invention will be explained with reference to FIGS. 23 and 24. In this embodiment, first supports 126A having different configurations are used. Similar configurations, operations, and effects to those of the first embodiment will not be explained.

Figure 23:
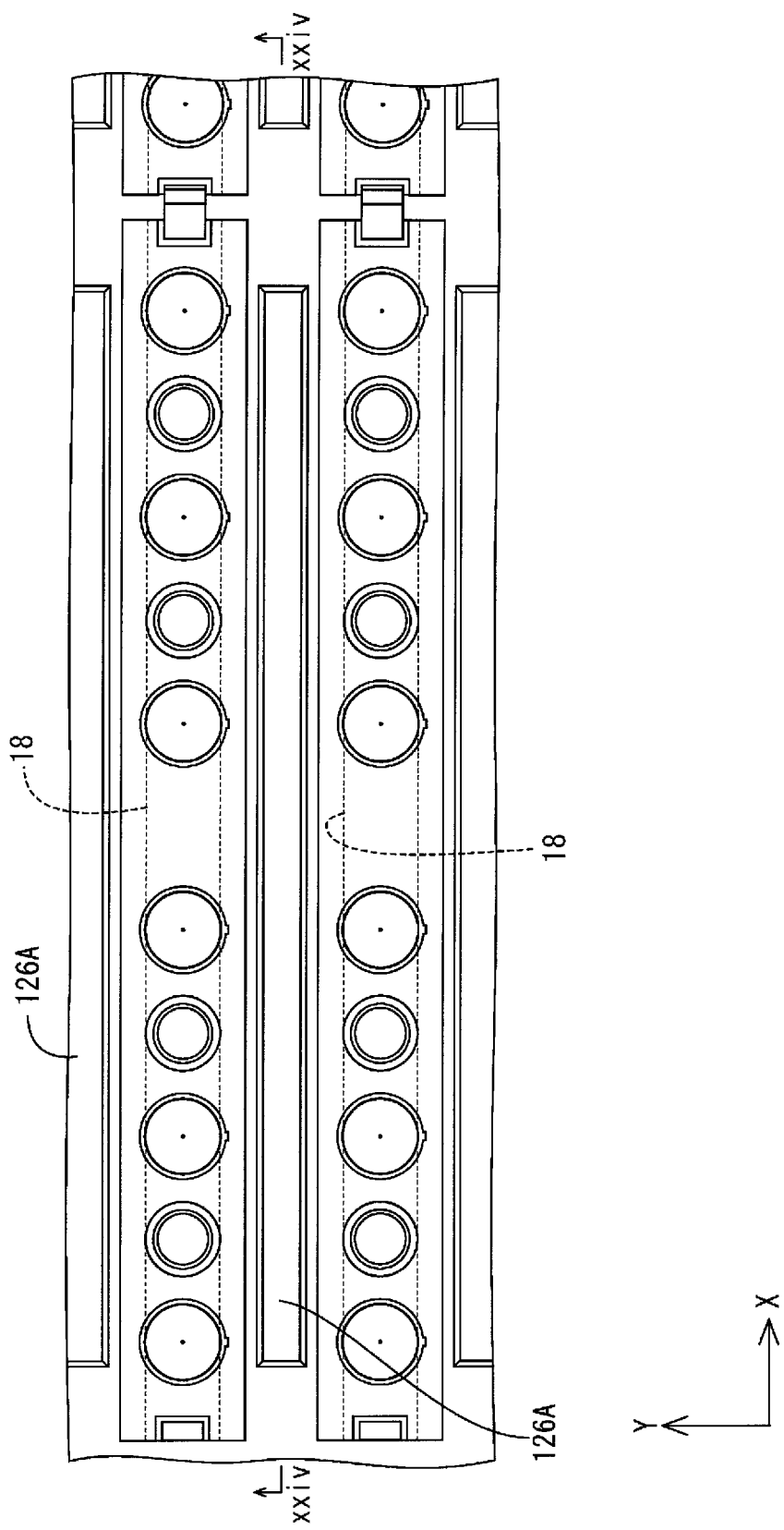
FIG. 23 is a plan view illustrating first supports of a chassis according to a second embodiment of the present invention.
Figure 24:
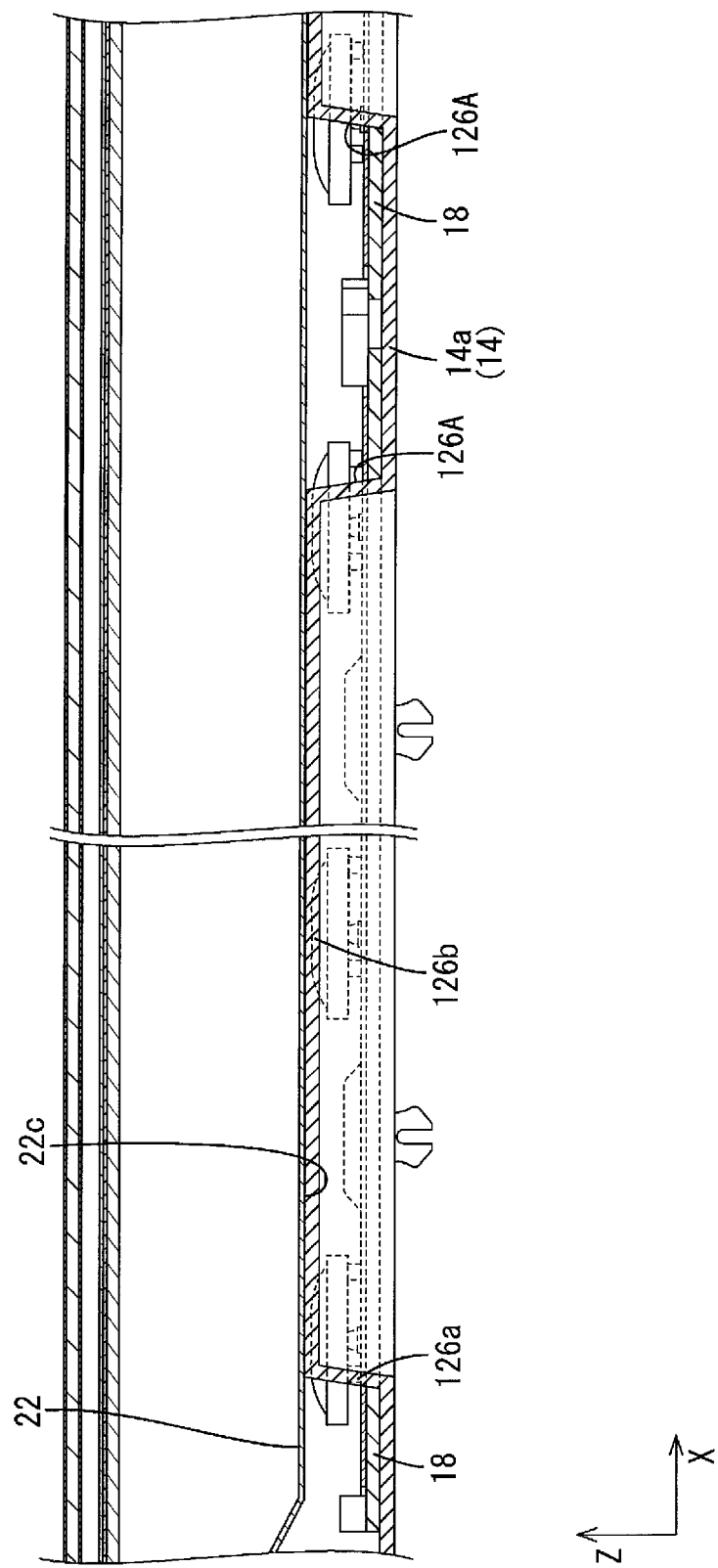
FIG. 24 is a cross-sectional view along line xxiv-xxiv in FIG. 23.

As illustrated in FIG. 23, the first supports 126A are arranged adjacently to the respective LED boards 18 with respect to the Y-axis direction and along the X-axis direction, that is, the long edges of the LED boards 18. Each support 126A has a rectangular plan-view shape similar to the LED board 18. As illustrated in FIG. 24, each support 126A includes peripheral walls 126a and a support wall 126b. The peripheral walls 126a rise from the bottom plate 14a. The support wall 126b connects the top edges of the peripheral walls 126a. The peripheral walls 126a include a pair of short walls and a pair of long walls connected to one another. The short walls are arranged at ends of the X dimension thereof. The long walls are arranged at ends of the Y-dimension thereof. The support wall 126b has an elongated rectangular plate-like shape extending along the X-axis direction and a size slightly smaller than the LED board 18. The entire area of the support wall 126b is in surface contact with the rear surface 22c of the chassis-side reflection sheet 22. Namely, an area of the chassis-side reflection sheet 22 adjacent to the LED board 18 with respect to the Y-axis direction in plan view is supported by the first support 126A with the first support 126A in surface contact with the area. With this configuration, the flatness of the chassis-side reflection sheet 22 can be maintained at an even higher level.

According to this embodiment, the first supports 126A that are board-non-overlapping supports extend along the outer edges of the LED boards 18. With this configuration, the flatness of the chassis-side reflection sheet 22 can be maintained more properly by the first supports 126A that extend along the outer edges of the LED boards 18.

<Third Embodiment>

The third embodiment of the present invention will be explained with reference to FIG. 25. In this embodiment, board holding members 220 having different configurations are used. Similar configurations, operations, and effects to those of the first embodiment will not be explained.

Figure 25:
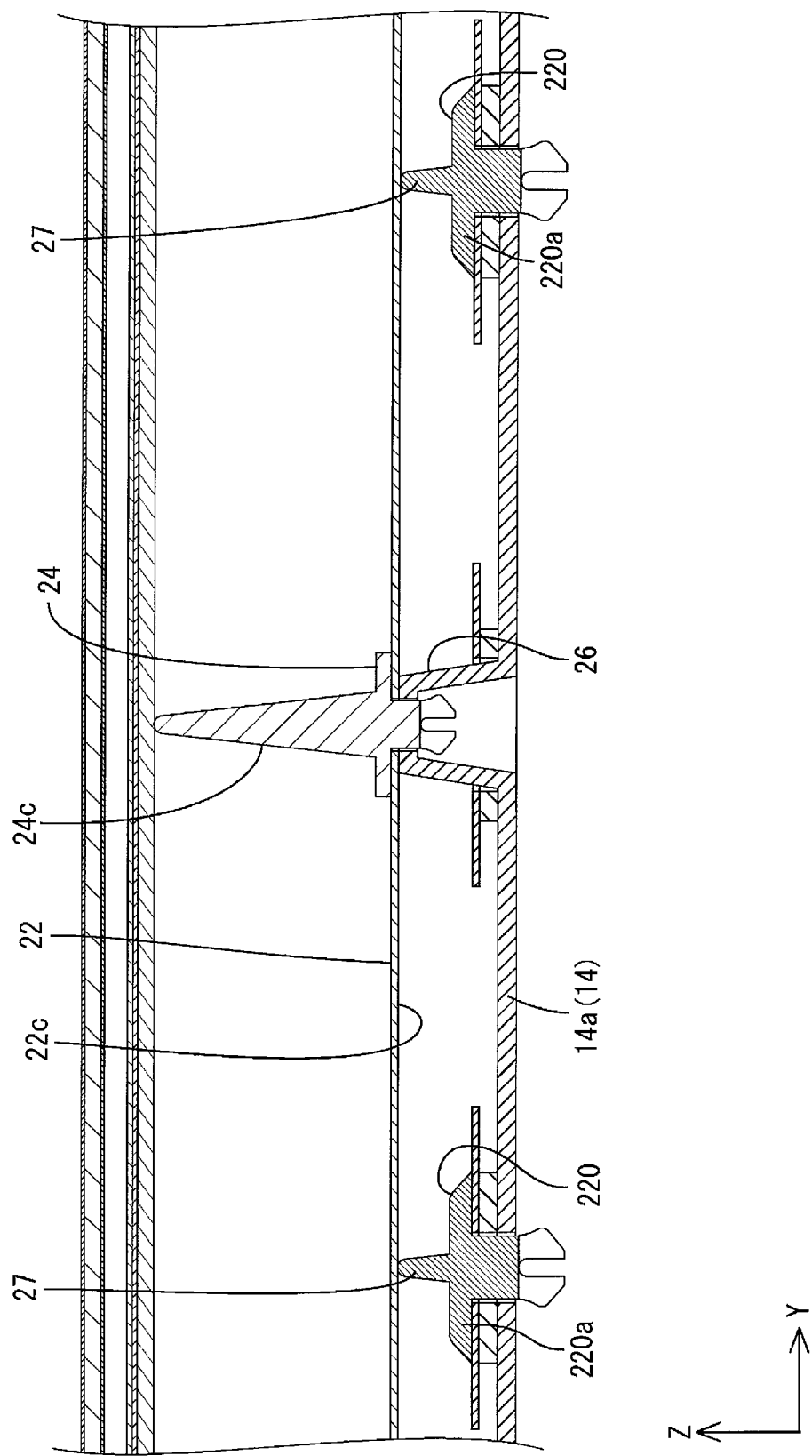
FIG. 25 is a cross-sectional view illustrating the a board holding member according to a third embodiment of the present invention.

As illustrated in FIG. 25, a support 27 that projects from a body portion 220a of each board holding member 220 is provided. The support 27 supports the chassis-side reflection sheet 22. The support 27 is provided integrally with the board holding member 220. The support 27 has a cone-like overall shape with a round tip. The support 27 has a protruding dimension such that the tip thereof is set at about the same position as the other supports 26 with respect to the Z-axis direction. The supports 27 are in contact with the rear surface 22c of the chassis 14. Namely, the supports 27 hold the chassis-side reflection sheet 22 together with the other supports 26 at a specified Z position. A large number of the board holding members 220 are arranged in a matrix within a plane of the bottom plate 14a of the chassis 14 (see FIG. 3). With the supports 27 arranged on the board holding members 220, the chassis-side reflection sheet 22 can be stably supported and thus the flatness at even higher level can be achieved. During the mounting of the board holding members 220 to the chassis 14, the person doing the mounting can use the supports 27 as holding parts. Therefore, the workability in the mounting of the board holding members 220 can be improved.

According to this embodiment, the supports 27 are integrally provided with the respective board holding member 220. With this configuration, the chassis-side reflection sheet 22 can be supported by the supports 27 integrally provided with the respective board holding members 220.

<Fourth Embodiment>

The fourth embodiment of the present invention will be explained with reference to FIG. 26. In this embodiment, supports are provided separately from the chassis 14. Similar configurations, operations, and effects similar to the first embodiment will no be explained.

Figure 26:
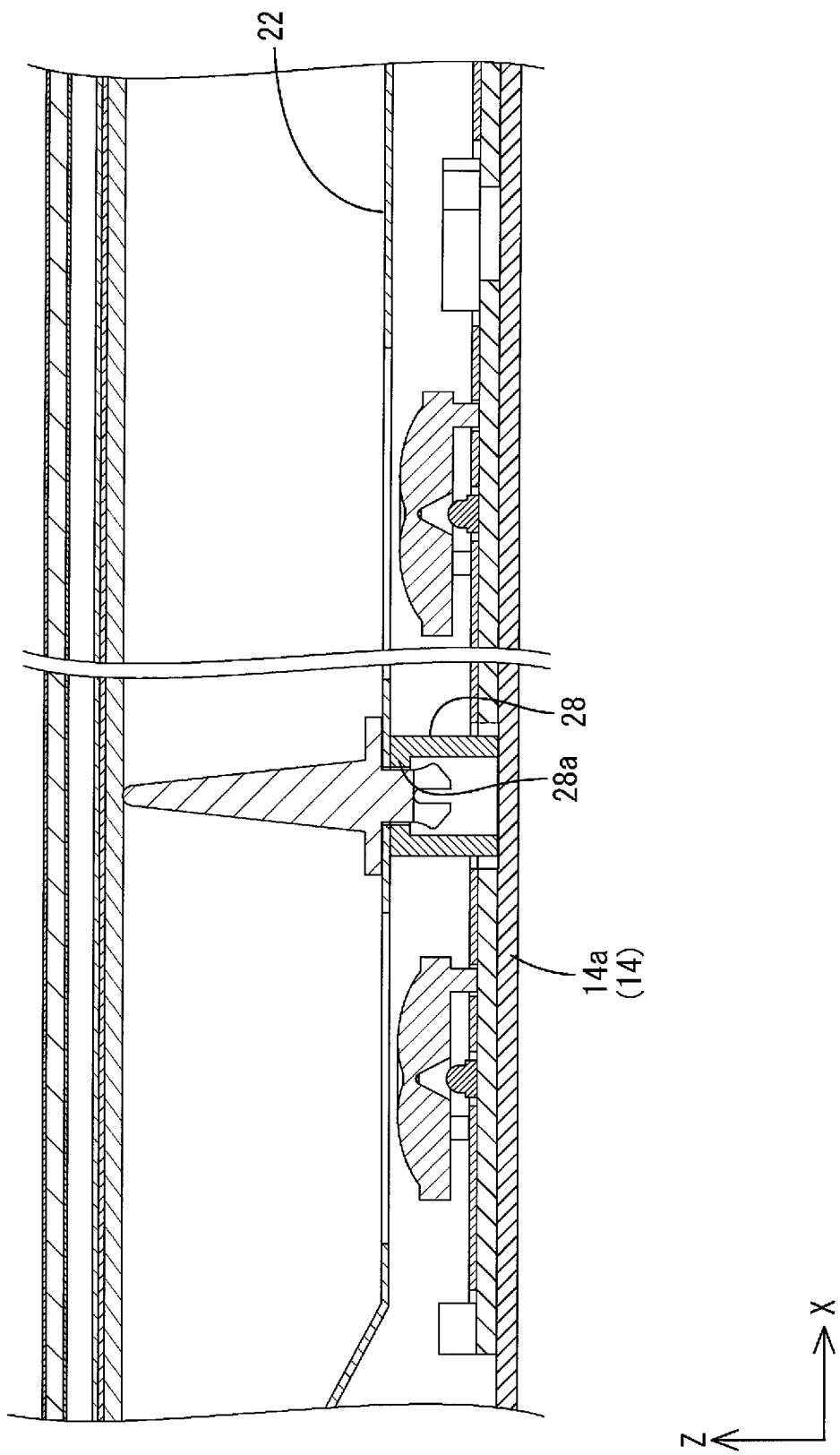
FIG. 26 is a cross-sectional view illustrating a support according to a fourth embodiment of the present invention.

As illustrated in FIG. 26, the supports 28 are prepared as separate parts from the chassis 14 and integrally fixed to the bottom plate 14a of the chassis 14 by fixing members, such as adhesives. Each support 28 has a rectangular-tube-like overall shape with a bottom. The bottom is a support wall 28a that supports the chassis-side reflection sheet 22. By preparing the supports 28 as the separate parts from the chassis 14, a material and a shape of the supports 28 can be freely selected.

<Fifth Embodiment>

Figure 27:
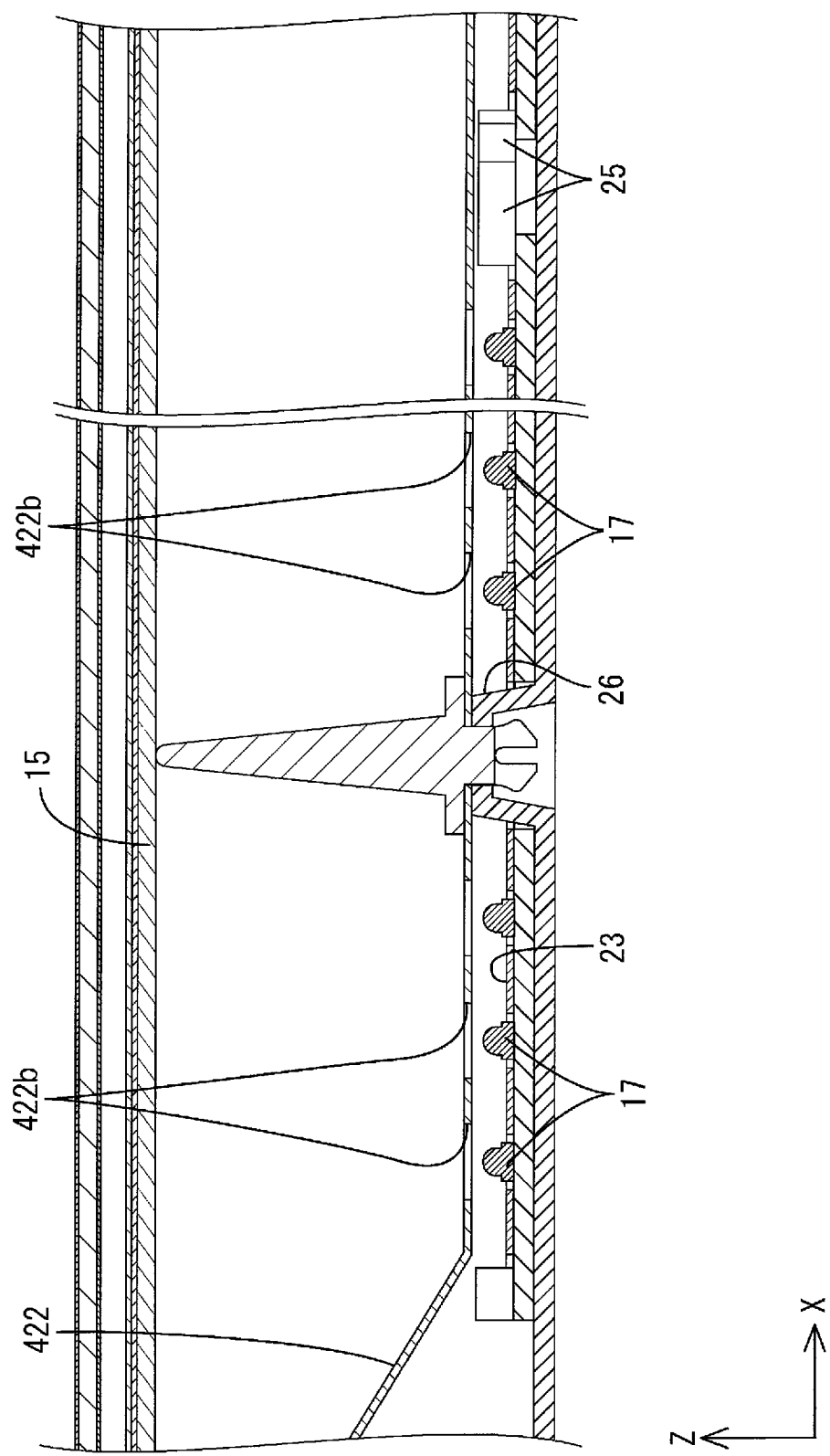
FIG. 27 is a cross-sectional view illustrating a backlight unit according to a fifth embodiment of the present invention.

The fifth embodiment of the present invention will be explained with reference to FIG. 27. In this embodiment, the diffuser lenses 19 are not used. Similar configurations, operations, and effects to the first embodiment will not be explained.

In this embodiment, the diffuser lenses 19 in the first embodiment are not used. As illustrated in FIG. 27, light emitted by each LED 17 directly reaches the optical member 15. Holes 422b is provided in areas of the chassis-side reflection sheet 422 overlapping the LEDs 17 in plan view. Light emitted by each LED 17 passes through the corresponding hole 422b. A diameter of each hole 422b is defined so as not to block the light emitted by the corresponding LED 17 because the chassis-side reflection sheet 422 is arranged more to the front than the LEDs 17. The chassis-side reflection sheet 422 is held at a position more to the front and away from the LEDs 17 and the connectors 25. Therefore, the LEDs 17 are not in the respective holes 422b. In this embodiment, the diffuser lenses 19 are not used. Therefore, the size of the holes 422b formed in the chassis-side reflection sheet 422 can be reduced. When the diffuser lenses 19 are not used as in this embodiment, the board-side reflection sheets 23 may not be used as well.

<Other Embodiments>

The embodiments according to the present invention have been described. The present invention is not limited to the embodiments explained in the above description with reference to the drawings. The following embodiments may be included in the technical scope of the present invention, for example.

(1) The shapes of the supports can be altered from those in the above embodiments as necessary. For example, each support may have a truncated pyramid-like shape or a drum-like shape with a bottom.

(2) The arrangements or the numbers of the supports inside the chassis may be altered from those in the above embodiments as necessary. Especially, a ratio between the number of the first supports and that of the second supports may be altered as necessary as well as the absolute value of the number of the installed supports and the arrangements.

(3) Two kinds of supports, the first supports and the second supports, are used in the above embodiments. However, only one of the kinds, the first supports or the second supports, may be used as the supports.

(4) In the above embodiments, the second supports (the board-overlapping supports) arranged in the areas overlapping the LED boards in plan view have the mounting holes and the sheet holding members are mountable thereto. However, the first supports (the board-non-overlapping supports) arranged in the areas not overlapping the LED boards in plan view may have mounting holes, and the sheet holding members may be mountable thereto. In this case, the second supports may not have the mounting hole and the sheet holding members may be attached to only the first supports.

(5) In the above embodiments, the second supports have the mounting holes for attaching the sheet holding members. However, if a different method that does not require the mounting holes is used for attaching the sheet holding members, the mounting holes may not be necessary. For example, the method for attaching the sheet holding members may include passing the base of each sheet holding member, from which the elastically locking pieces are removed, through the through hole of the chassis-side reflection sheet and fixing it to the second support with an adhesive. A method, such as welding, may be also used other than the adhesive.

(6) Similarly to the above embodiment (5), the method for attaching the board holding members to the chassis can be altered. When a different method is used, the mounting holes of the chassis may not be required.

(7) In the above embodiments, the connectors of the LED boards adjacently arranged with respect to the X-axis direction are directly engaged with each other. However, the connectors mounted on the LED boards may be connected via the wires or the LED boards without the connectors may be connected directly by wires. In such a case, the wires are components mounted on the LED boards and thus the chassis-side reflection sheet is preferably held by the supports at a position away from the wires. However, the chassis-side reflection sheet may be arranged at a position on the same plane on which the wires are arranged.

(8) The support positions of the chassis-side reflection sheets supported by the supports in the above embodiments may be altered as necessary. For example, the chassis-side reflection sheet may be held at a position such that the rear surface of the chassis-side reflection sheet is arranged closer to the mounting surfaces of the LED boards than the front surfaces of the connectors. The chassis-side reflection sheet in the fifth embodiment may be held at a position such that the LEDs are arranged in the holes of the chassis-side reflection sheet.

(9) In the second embodiment, each first support having a horizontally long shape is arranged adjacently to the LED board with respect to the Y-axis direction. However, the long dimension of each horizontally long first support may be reduced and a plurality of the first supports may be arranged along each LED board. Alternatively, the first support may be arranged along a plurality of the LED boards with respect to the X-axis direction.

(10) The shape and the arrangement of the supports of the board holding members in the third embodiment may be altered as necessary. The board holding members in the first embodiment may be used together with the board holding members in the third embodiment.

(11) In the above embodiments, the board-side reflection sheets are overlaid on the mounting surfaces of the LED boards. However, the board-side reflection sheets may not be required. In such a case, a light reflection surface in white having high light reflectivity may be formed on the mounting surface of each LED board.

(12) In the above embodiments, the connectors (the wires in embodiment (7)) are provided as the components mounted on the LED boards. However, components other than the connectors may be provided as components mounted on the LED boards. For example, LED boards including non-optical components, such as resistors, capacitors, and transformers, as components mounted on the LED boards may be used. Surfaces of such non-optical components tend to have lower light reflectivities than the chassis-side reflection sheet. Therefore, whether holes for passing the non-optical components are required is not easily determined. For such a reason, the configurations of the present invention are highly effective when the LED boards including the non-optical components as the components mounted thereon are used.

(13) In the above embodiments, the supports are integrally provided with the chassis or the board holding members. However, the supports may be integrally provided with the LED boards.

(14) In the above embodiment, a plurality of the LED boards are arranged along the X-axis direction and connected to each other by the connectors. However, only one LED board may be arranged along the X-axis direction.

(15) In the above embodiments, each sheet holding member has the diffuser plate holding support. However, the diffuser plate holding support may be removed from each sheet holding member. Alternately, each board holding member may have the diffuser plate holding support. In such a case, the chassis-side reflection sheet may be the holes for passing the diffuser plate supports.

(16) In the above embodiments, the sheet holding members that hold the chassis-side reflection sheet and the board holding members that hold the LED boards are separated provided. However, hybrid-type holding members configured to hold the LED boards and the chassis-side reflection sheet may be used.

(17) In the above embodiments, attachment-type fixing members are used as attachment parts for attaching the holding members to the chassis. However, slide-type fixing members may be used as attachment parts. The slide-type fixing member corresponds to a fixing member including a hook-like fixing portion and a main portion that is pushed into the bottom plate of the chassis and slid along the bottom plate so that the hook-like fixing portion is locked to the edge of the mounting hole.

(18) In the above embodiment, the chassis is made of metal. However, the chassis may be made of other materials including a synthetic resin.

(19) In the above embodiments, the holding members have white surfaces. However, the color of the surfaces of the holding members may be milky white or silver. Alternately, the surfaces of the holding members may be painted in any color to define the color of the surfaces.

(20) In the above embodiments, the five-LED-type LED boards, the six-LED-type LED boards, and the eight-LED-type LED boards are used in a proper combination. However, LED boards on which the numbers of the LEDs other than five, six, or eight are mounted may be used.

(21) In the above embodiments, each LED includes the single light emitting LED chip configured to emit blue light and is configured to white light using fluorescent substances. However, LEDs each including a single light emitting LED chip configured to emit ultraviolet light and is configured to white light using fluorescent substances may be used.

(22) In the above embodiments, each LED includes the single light emitting LED chip configured to emit blue light and is configured to white light using fluorescent substances. However, LEDs each including three kinds of single light emitting LED chips may be used. The single light emitting diodes emit R, G, and B colors of light, respectively. Alternatively, LEDs each including three other kinds of single light emitting LED chips may be used. The single light emitting diodes emit cyan (C), magenta (M), and yellow (Y) colors of light, respectively.

(23) In the above embodiments, the LEDs configured to emit white light are used. However, LEDs configured to emit red light, LEDs configured to emit blue light, and LEDs configured to emit green light may be used in proper combinations.

(24) In the above embodiments, the LEDs are used as light sources. However, other types of light sources can be used.

(25) In the first to the fourth embodiments, the diffuser lenses configured to diffuse light from the LEDs are used as optical lenses. However, optical lenses other than the diffuser lenses (e.g., collective lenses having light collecting capabilities) may be used.

(26) The screen size or the aspect ratio of the screen can be altered from those in the embodiments as necessary.

(27) The liquid crystal panel and the chassis are set in the vertical position with the short-side directions thereof aligned with the vertical direction. However, the liquid crystal panel and the chassis may be set in the vertical position with a long-side direction thereof aligned with the vertical direction.

(28) In the above embodiments, the TFTs are used as switching components of the liquid crystal display device. However, the technology described herein can be applied to liquid crystal display devices using switching components other than TFTs (e.g., thin film diodes (TFDs)). Furthermore, it can be applied to black-and-white liquid crystal display devices other than the color liquid crystal display device.

(29) In the above embodiments, the liquid crystal display device including the liquid crystal panel as a display panel is used. However, the present invention can be applied to display devices including other types of display panels.

(30) In the above embodiments, the television receiver including the tuner is used. However, the technology can be applied to a display device without the tuner.

The invention claimed is:

1. A lighting device, comprising:
a light source;
a light source board on which the light source is mounted;
a mounted component mounted on a mounting surface of the light source board, the mounting surface on which the light source is mounted;
a reflection member configured to reflect light and arranged on the mounting surface of the light source board, the mounting surface on which the light source and the mounted component are mounted;
a support holding the reflection member away from the mounting surface of the light source board; and
a chassis having an opening through which light from the light source exits and housing the light source board and the reflection member; wherein
the support is integrally provided with the chassis;
the support includes a board-overlapping support arranged in an area overlapping the light source board in plan view; and
the light source board has a through hole through which the board-overlapping support portion is passed.

2. The lighting device according to claim 1, wherein the support includes at least one pair of board-non-overlapping supports arranged in areas not overlapping the light source board and on respective sides of the light source board in plan view.

3. The lighting device according to claim 2, wherein a plurality of the board-non-overlapping supports are arranged along outer edges of the light source board.

4. The lighting device according to claim 2, wherein the board-non-overlapping portions extend along outer edges of the light source board.

5. A lighting device, comprising:
a light source;
a light source board on which the light source is mounted;
a mounted component mounted on a mounting surface of the light source board, the mounting surface on which the light source is mounted;
a reflection member configured to reflect light and arranged on the mounting surface of the light source board, the mounting surface on which the light source and the mounted component are mounted;
a support holding the reflection member away from the mounting surface of the light source board; and
a chassis having an opening through which light from the light source exits and housing the light source board and the reflection member; wherein
the reflection member includes a board-side reflection member and a chassis-side reflection member, the board-side reflection member being overlaid on the mounting surface of the light source board, the chassis-side reflection member being arranged along an inner surface of the chassis and closer to the opening than the board-side reflection member; and
the support is formed so as to hold the chassis-side reflection member away from a surface of the board-side reflection member on an opening side.

6. A lighting device, comprising:
a light source;
a light source board on which the light source is mounted;
a mounted component mounted on a mounting surface of the light source board, the mounting surface on which the light source is mounted;
a reflection member configured to reflect light and arranged on the mounting surface of the light source board, the mounting surface on which the light source and the mounted component are mounted;
a support holding the reflection member away from the mounting surface of the light source board;
a chassis having an opening through which light from the light source exits and housing the light source board and the reflection member; and
a board holding member holding the light source board between the chassis and the board holding member.

7. The lighting device according to claim 6, wherein the support is integrally provided with the board holding member.

8. A lighting device, comprising:
a light source;
a light source board on which the light source is mounted;
a mounted component mounted on a mounting surface of the light source board, the mounting surface on which the light source is mounted;
a reflection member configured to reflect light and arranged on the mounting surface of the light source board, the mounting surface on which the light source and the mounted component are mounted; and a support holding the reflection member away from the mounting surface of the light source board; wherein the reflection member has a hole through which light from at least the light source passes, the hole being formed in an area overlapping the light source in plan view;

the lighting device further comprising a diffuser lens configured to diffuse light from the light source, the diffuser lens being mounted in an area of the light source board overlapping the light source in plan view; and the hole has a size that allows light at least from the diffuser lens to pass through.

9. The lighting device according to claim 8, wherein the support is formed so as to hold the reflection member away from the diffuser lens on a side away from the mounting surface of the light source board.

10. The lighting device according to claim 8, wherein:

the hole has a size that allows the diffuser lens to pass through; and the support is formed so as to hold the reflection member such that the diffuser lens is arranged within the hole.

11. The lighting device according to claim 1, wherein the light source is an LED.

12. A display device comprising:

the lighting device according to claim 1; and a display panel configured to provide display using light from the lighting device.

13. A television receiver comprising the display device according to claim 12.

14. The lighting device according to claim 5, wherein the light source is an LED.

15. The lighting device according to claim 6, wherein the light source is an LED.

16. The lighting device according to claim 8, wherein the light source is an LED.

17. A display device comprising:

the lighting device according to claim 5; and a display panel configured to provide display using light from the lighting device.

18. A display device comprising:

the lighting device according to claim 6; and a display panel configured to provide display using light from the lighting device.

19. A display device comprising:

the lighting device according to claim 8; and a display panel configured to provide display using light from the lighting device.

20. A television receiver comprising the display device according to claim 17.

21. A television receiver comprising the display device according to claim 18.

22. A television receiver comprising the display device according to claim 19.

* * * * *